(12) United States Patent
Hartmann et al.

(10) Patent No.: US 9,795,829 B2
(45) Date of Patent: Oct. 24, 2017

(54) ANTENNA SYSTEM AND METHOD FOR DETERMINING A TRANSIT OF A MOVABLE OBJECT THROUGH A DETECTION PLANE

(71) Applicant: FRAUNHOFER-GESELLSCHAFT ZUR FÖRDERUNG DER ANGEWANDTEN FORSCHUNG E.V., München (DE)

(72) Inventors: Markus Hartmann, Sulzbach-Rosenberg (DE); Tobias Draeger, Baiersdorf (DE)

(73) Assignee: Frauenhofer-Gesellschaft zur Foerderung der angewandten Forschung, Munich (DE)

( * ) Notice: Subject to any disclaimer, the term of this patent is extended or adjusted under 35 U.S.C. 154(b) by 0 days.

(21) Appl. No.: 14/894,005

(22) PCT Filed: Jun. 6, 2014

(86) PCT No.: PCT/EP2014/061892
§ 371 (c)(1),
(2) Date: Nov. 25, 2015

(87) PCT Pub. No.: WO2014/198672
PCT Pub. Date: Dec. 18, 2014

(65) Prior Publication Data
US 2016/0107028 A1    Apr. 21, 2016

(30) Foreign Application Priority Data

Jun. 12, 2013  (EP) .................................... 13171735

(51) Int. Cl.
*A63B 24/00*    (2006.01)
*A63B 71/00*    (2006.01)
(Continued)

(52) U.S. Cl.
CPC ........ *A63B 24/0021* (2013.01); *A63B 63/004* (2013.01); *A63B 71/0605* (2013.01);
(Continued)

(58) Field of Classification Search
CPC ......... A63B 24/00; A63B 71/00; A63B 43/00; G01D 5/20; G08B 13/14; G01B 7/14; H01Q 7/08
(Continued)

(56) References Cited

U.S. PATENT DOCUMENTS 5,748,073 A * 5/1998 Crawford ........... A63B 24/0021
273/354
2004/0217866 A1* 11/2004 Copeland ........... G06K 7/10336
340/572.7

(Continued)

FOREIGN PATENT DOCUMENTS

EP    0227453 A2    7/1987
EP    1987497 A1    11/2008
(Continued)

*Primary Examiner* — Son Le
*Assistant Examiner* — Neel Shah
(74) *Attorney, Agent, or Firm* — 2SPL Patentanwaelte PartG mbB; Mani Arabi

(57) ABSTRACT

Embodiments relate to a concept for determining a transit of a movable object through a detection area within a detection plane. At least one exciter antenna provides an exciting electromagnetic field. The exciting electromagnetic field or at least one spatial component thereof has a field strength above a field strength threshold in the detection area. The exciting electromagnetic field is capable of exciting the movable object to emit an electromagnetic response signal comprising information on a position of the movable object. At least one sensor antenna comprising a magnetic core receives the electromagnetic response signal. The at least one magnetic core is positioned in a region of the exciting electromagnetic field where the field strength of the exciting (Continued)

electromagnetic field or the at least one spatial component thereof is below the field strength threshold.

14 Claims, 11 Drawing Sheets

(51) Int. Cl.

| | |
|---|---|
| A63B 43/00 | (2006.01) |
| G01D 5/20 | (2006.01) |
| G08B 13/14 | (2006.01) |
| G01B 7/14 | (2006.01) |
| H01Q 7/08 | (2006.01) |
| H01Q 1/22 | (2006.01) |
| H01Q 7/00 | (2006.01) |
| H01Q 7/06 | (2006.01) |
| H01Q 21/28 | (2006.01) |
| A63B 63/00 | (2006.01) |
| A63B 71/06 | (2006.01) |
| A63B 102/24 | (2015.01) |
| A63B 102/20 | (2015.01) |
| A63B 102/34 | (2015.01) |
| A63B 102/22 | (2015.01) |

(52) U.S. Cl.
CPC ............ *G01D 5/20* (2013.01); *H01Q 1/2216* (2013.01); *H01Q 1/2225* (2013.01); *H01Q 7/00* (2013.01); *H01Q 7/06* (2013.01); *H01Q 7/08* (2013.01); *H01Q 21/28* (2013.01); *A63B 2024/0028* (2013.01); *A63B 2024/0034* (2013.01); *A63B 2102/20* (2015.10); *A63B 2102/22* (2015.10); *A63B 2102/24* (2015.10); *A63B 2102/34* (2015.10); *A63B 2220/89* (2013.01); *A63B 2225/54* (2013.01); *A63B 2243/007* (2013.01); *A63B 2243/0025* (2013.01); *A63B 2243/0033* (2013.01)

(58) Field of Classification Search
USPC .......... 324/207.11, 207.22; 340/568.1, 572.7
See application file for complete search history.

(56) References Cited

U.S. PATENT DOCUMENTS

| | | | |
|---|---|---|---|
| 2006/0247076 A1* | 11/2006 | Petersen | ............ A63B 24/0021 473/476 |
| 2007/0299625 A1 | 12/2007 | Englert et al. | |
| 2009/0045954 A1* | 2/2009 | Hall | .................. G08B 13/2474 340/568.1 |
| 2010/0184563 A1* | 7/2010 | Molyneux | ............ A43B 1/0054 482/1 |

FOREIGN PATENT DOCUMENTS

| | | |
|---|---|---|
| EP | 1489572 A1 | 12/2014 |
| GB | 2001250 A | 1/1979 |
| WO | WO 2009046722 A1 | 4/2009 |

* cited by examiner

US 9,795,829 B2

ANTENNA SYSTEM AND METHOD FOR DETERMINING A TRANSIT OF A MOVABLE OBJECT THROUGH A DETECTION PLANE

CROSS-REFERENCE TO RELATED APPLICATIONS

This application is the National Phase under 35 U.S.C §371 of PCT International Application No. PCT/EP/2014/061892, which has an International filing date of Jun. 6, 2014, and which claims priority to European Patent Application No. EP13171735.7, filed on Jun. 12, 2013, the entire contents of which are hereby incorporated herein by reference.

FIELD

Embodiments relate to an antenna system for determining a transit of a movable object through a detection plane and to a method for determining said transit.

BACKGROUND

Applications, where objects are monitored with respect to their movement are numerous, as for example in sports games. Sports games, such as for example soccer, football, handball, ice hockey, hockey or the like employ rules where one participating party scores when a movable object, such as a ball or the like, crosses a predetermined detection plane, as for example the goal plane defined by goal line and/or a goal frame, e.g. a soccer goal. The question whether the ball completely passed the goal plane is of utmost importance to conclude whether a score has been achieved or not. Traditionally, that decision has been taken by a referee from a visual observation. Especially in scenarios where the ball moves into the direction of the goal and is returned quickly by the goal keeper or a goalpost, it is difficult to determine, whether the ball entered completely into the goal, i.e., whether the ball has sufficiently crossed the goal plane/line.

Apart from camera-based optical systems, some other approaches propose to detect the transition of the ball through a detection plane using electromagnetic fields and/or evaluation signals derived therefrom. Some proposed systems provide magnetic fields of different direction on opposite sides of the detection plane and/or different frequencies and/or different modulations together with sensors within the moving object or the ball under observation. That is to say, a sensor within the movable object may monitor the (electro-) magnetic field and determines that it passed through the detection plane when the orientation of the magnetic field has changed. In that event, the moving object or a transceiver contained therein may transmit information that the movable or moving object has detected transition through the detection plane to a receiver circuit such as to be able to indicate whether the ball was inside the goal or not.

Other systems utilize two antenna loops on each side of the detection plane, wherein each antenna loop receives a high-frequency signal with opposite phase such as to provide magnetic fields cancelling each other out in the detection plane in the middle between the two loops. A third receive antenna loop defining a detection plane is deployed in order to receive a field disturbance of a moving object passing through the set-up such as to be able to conclude, on occurrence of a signal on the receive antenna loop, that a ball or a moving object passed the plane of the receive antenna loop.

In order to provide or to receive the (electro-) magnetic field used for the detection, those systems utilize antenna loops fully encircling an area of interest or detection area within the detection plane, such as for example a goal frame. Those systems suffer from a decreased spatial resolution, as the generation of a precise field configuration over large areas is hardly feasible.

Hence, there is a desire to provide improved systems and methods for determining the transit of a moving or movable object through a detection plane.

SUMMARY

Embodiments are based on the finding that a transition of a moving object through a detection plane or an area of interest thereof may be detected by generating an exciting or excitation (electro-) magnetic field by an antenna setup covering the area of interest within the detection plane, such as e.g. a goal frame in a goal plane. This exciting (electro-) magnetic field may be received and at least partly reflected by a further antenna placed at or within the movable object, such as e.g. an item of sports equipment, such as a ball, a puck or the like. The reflected (electro-) magnetic field may again be received by one or more sensor antennas located around the area of interest or detection area of the detection plane. From the course of the sensor or receive signal it may be detected when the movable or moving object transits through or crosses the detection plane. It is possible to employ loop antennas as exciter and/or sensor antennas. To further improve the quality of the receive signal embodiments propose a special antenna setup employing magnetic cores in the sensor antennas in order to intensify a detection of the receive signal.

According to a first aspect embodiments provide an antenna system for determining a transit of a movable or moving object through a detection area within a detection plane. The antenna system comprises at least one exciting or exciter antenna configured to provide an exciting electromagnetic field, wherein the exciting electromagnetic field, or at least a spatial or vector component thereof, has a (magnetic) field strength above a certain field strength threshold within the detection area. The vector component may be a component being perpendicular to the detection plane. Thereby the exciting electromagnetic field is capable of exciting the movable or moving object to emit an electromagnetic response signal comprising information on a position or location of the movable object. Further, the antenna system comprises at least one sensor antenna having a magnetic core for receiving the electromagnetic response signal. Thereby the magnetic core is positioned in a region of the provided exciting electromagnetic field where a field-strength of the exciting electromagnetic field or at least a spatial (or vector) component thereof is below said field strength threshold. For example, the magnetic core may be positioned in a region of the provided exciting electromagnetic field, where the electromagnetic field or a vector component thereof parallel to a longitudinal axis of the magnetic core has essentially zero field strength.

According to a second aspect it is provided a goal, e.g. a soccer goal, having coupled thereto an embodiment of the antenna system, for example at a predetermined distance to a goal line. In such embodiments the detection plane may be parallel to or coincide with the goal plane, i.e. the plane defined by the goal line and a goal frame of the goal. Hence, with such embodiments, automated and reliable goal detection may be achieved.

According to a further aspect some embodiments also provide a method for determining a transit of a movable object through a detection area within a detection plane. The method comprises providing, by means of at least one exciter antenna, an exciting electromagnetic field, wherein the exciting electromagnetic field, or at least a spatial component thereof, has a (magnetic) field strength above a field strength threshold within the detection area. The vector component may be a component being perpendicular to the detection plane. Thereby the exciting electromagnetic field is capable of exciting the movable object to emit an electromagnetic response signal comprising information on a position of the movable object. The method also comprises receiving the electromagnetic response signal by means of at least one sensor antenna comprising a magnetic core, wherein the at least one magnetic core is positioned in a region of the exciting electromagnetic field where a field-strength of the exciting electromagnetic field or at least a spatial component thereof is below said field strength threshold, i.e. in an area of low or close-to-zero field strength. For example, the magnetic core may be positioned in a region of the provided exciting electromagnetic field, where the electromagnetic field or a vector component thereof parallel to a longitudinal axis of the magnetic core has essentially zero field strength. This region can be in or in close proximity to the detection plane.

In embodiments the exciting electromagnetic field may be an alternating electromagnetic field generated by means of alternating exciter current through the at least one exciter antenna. Thereby the alternating exciter current may be composed of at least one AC signal of one or more different frequencies.

According to embodiments the magnetic core may essentially be positioned or located in the detection plane, however, preferably but not necessarily outside the detection area, which may also be denoted as area of interest with the detection plane. The region where the field-strength of the exciting electromagnetic field is below the field strength threshold may be obtained due to at least partial destructive superposition of (magnetic) sub fields generated by different electrical conductors of the exciter antenna. For example, the electrical conductors may be arranged symmetrically around the region. In particular, the arrangement of the electrical conductors of the exciter antenna may be such that at least two of three mutually perpendicular spatial components of the superimposed exciting electromagnetic field essentially vanish within the detection plane. Only the third magnetic field component crossing the detection plane perpendicularly does not vanish and contributes to a magnetic field strength above the field strength threshold. Instead, this third field component forming a normal of the detection plane may be maximized due to constructive superposition of the sub fields.

In other words the at least one exciter antenna may be configured to provide an exciting electromagnetic field, such that two of three mutually perpendicular spatial or vector components of the exciting electromagnetic field ideally or essentially vanish within the detection plane. Thereby the third non-vanishing component of the exciting electromagnetic field forming a normal of the detection plane is capable of exciting the movable object to emit an electromagnetic response signal comprising information on a position or location of the movable object. Further, the antenna system comprises at least one sensor antenna having a magnetic core for receiving the electromagnetic response signal. Thereby the magnetic core is essentially positioned in the detection plane, such that a main or longitudinal axis of the magnetic core extends in the detection plane and perpendicularly to the third non-vanishing exciting electromagnetic field component.

In other words embodiments suggest using at least one, preferably more than one sensor antennae comprising a magnetic core, respectively, although the field strength of the exciting (electro-) magnetic field would normally prohibit the usage of magnetic cores in the sensor antenna due to saturation effects of the core material. A magnetic core may be understood as a piece of magnetic material with a high permeability used to confine and guide magnetic fields in electrical, electromechanical and magnetic devices such as electromagnets, transformers, electric motors, inductors and magnetic assemblies. It may be made of or comprise ferromagnetic metal such as iron, or ferrimagnetic compounds such as ferrites. Hence, the at least one magnetic core may comprise ferrite, such that the sensor antenna may be regarded as a ferrite antenna. In embodiments a length/diameter ratio of the magnetic core is high. For example, the length/diameter ratio may be larger than 10 or even larger than 20.

Normally, without special placing the high permeability of the magnetic core, relative to the surrounding air, would cause the magnetic field lines of the exciting (electro-) magnetic field to be concentrated in the core material, thereby driving it into saturation. This saturation of the magnetic core of the sensor antenna would normally conflict with its capability to detect the relatively weak reflected electromagnetic response signal of the movable object. Note that the field strength of the backscattered electromagnetic response signal may be around 50 dB to 110 dB weaker than the field strength of the exciting (electro-) magnetic field within the detection area within the detection plane. For example, the detection area or area of interest may be a goal opening surface in some embodiments. However, if the sensor antenna or at least the magnetic core thereof is placed into an area of the exciting (electro-) magnetic field or a component thereof parallel to the longitudinal axis of the magnetic core having a field strength below the predefined field strength threshold, the magnetic core can be used to advantageously detect the weak backscattered electromagnetic response signal. For this purpose embodiments suggest various antenna configurations which enable the generation of the (alternating) exciting magnetic field having weak areas below the mentioned field strength threshold. According to some embodiments this magnetic field strength threshold value (related to the alternating exciting field) may be chosen so as to enable the excitation of the electromagnetic response signal. For example, the magnetic field strength threshold may be in the range from 0.01 A/m to 10 A/m, more preferably in the range from $10^{-3}$ A/m to $10^{-1}$ A/m.

According to embodiments, the at least one exciter antenna is operable to emit an alternating exciting electromagnetic field, the exciting electromagnetic field exciting the moving object to the emission of a reflected or backscattered electromagnetic field conveying the response signal to a sensor antenna. That is to say, when movable objects not employing their own energy sources are utilized, the exciting electromagnetic field may provide energy for the movable object such as to enable the movable object to emit or backscatter an electromagnetic field in response to the exciting electromagnetic field. According to some embodiments, the exciting electromagnetic field may be provided by the same antenna utilized to receive the electromagnetic field emitted or reflected by the movable object, i.e., exciter antenna and sensor antenna may both be realized by a common antenna structure as will be explained in more detail. To this end, cross-talk signals may be avoided which may disturb the reception of the electromagnetic field of the moving object. Cross-talk signals may otherwise occur, when the exciting electromagnetic field would be generated by an independent exciter antenna. Emitting a magnetic field by means of a moving object may, therefore, be understood to be the generation of a magnetic field and/or an electric field by means of a sender/transmitter energized by a separate energy source as well as by means of backscattering an energizing magnetic and/or electric field. Emitting a magnetic field may, however, also be understood as any other mechanism employed by the moving object such as to generate a detectable receive signal in the sensor antenna of the antenna system. Emitting a magnetic field does therefore also comprise the possibility to additionally transfer information from the moving object to the antenna system by means of load modulation. To transfer information the quality factor of the resonant circuit in the moving object is modulated while a phase condition of the receive signal may still be utilized to detect the transit of the moving object through the detection plane.

According to some embodiments an antenna configuration may be such that the at least one exciter antenna comprises at least one exciter loop antenna, wherein the exciter loop antenna may span the detection plane. This means that an opening surface of the exciter loop antenna is parallel to or coincides with the detection plane, i.e. opening surface of the exciter loop antenna and detection plane have parallel normals or perpendiculars. Correspondingly, the sensor antenna may comprise at least one sensor loop antenna comprising one or more conductive windings around the magnetic core, wherein the sensor loop antenna may span a sensor antenna plane which is essentially perpendicular to the detection plane. This means that an opening surface of the sensor loop antenna (i.e., its windings) is parallel to or coincides with the sensor antenna plane. In some embodiments the sensor antenna plane may also be regarded as a symmetry plane of the sensor loop antenna, wherein a longitudinal axis of the magnetic core essentially forms a normal of the sensor antenna plane. That is to say, the sensor antenna plane may perpendicularly cross the middle of the mounted magnetic core. This means that the opening surface of the at least one exciter loop antenna and the at least one sensor loop antenna may be essentially perpendicular to each other. The term "essentially" is used to also cover production tolerances which can lead to the fact that exact perpendicularity may not be reached. However, even with production tolerances perpendicularity may be understood as enclosing an angle of 90°±10°. Hence, some embodiments suggest using loop antennas both at the exciting and the sensing end of the antenna system. Thereby a loop antenna may be understood as a radio antenna comprising a loop (or a plurality of loops) of wire, tubing, or other electrical conductor with its ends connected to a (balanced) transmission line.

In some embodiments the at least one magnetic core of the sensor antenna loop may be located within a predefined area around a (linear) intersection of the detection plane and the sensor antenna plane. Note that the intersection of the detection plane and the sensor antenna plane may be located outside the detection area or area of interest within the detection plane, e.g. outside the opening surface of a goal encircled by the goal frame. Although a center or middle of the magnetic core may not necessarily exactly coincide with the detection plane in some embodiments, it would still be preferable for a symmetric antenna setup. If the longitudinal axis of the magnetic core of the sensor (loop) antenna is located within the detection plane good detection results may be expected.

Hence, a sensor loop antenna may be utilized to detect a magnetic field component of a backscattered electromagnetic field wherein the orientation of the sensor loop antenna, i.e. the opening surface bordered by the conductors of the sensor antenna loop(s), may be perpendicular to the detection plane. In other words, the normal of the opening surface may be parallel to or coincide with the detection plane. By utilizing such a sensor loop antenna, the sensor antenna may be sensitive to a field component of the magnetic field emitted by the movable object which is parallel to the detection plane. Embodiments may help to determine whether a phase condition of a receive signal received at a signal terminal of the sensor loop antenna changes according to a predetermined condition.

According to some embodiments, this field component may undergo a change in its direction when the movable or moving object transits through the detection plane. That is to say, the receive signal at a signal terminal of the sensor loop antenna undergoes a phase change when the moving object moves through or crosses the detection plane. A phase change can be determined with utmost precision, enabling the determination whether the moving object has passed through the detection plane with high precision.

Some embodiments suggest forming the at least one exciting antenna (loop) by a hollow electric current conductor, for example, comprising copper or aluminum. The magnetic field outside of the hollow conductor looks the same as the magnetic field outside of a "normal" current-carrying conductor, while the magnetic field inside the hollow conductor will be essentially zero. Therefore, the at least one sensor antenna (loop) may comprise the at least one magnetic core inside the hollow electric current conductor, thereby positioning the magnetic core in a region of the exciting (electro-) magnetic field which is essentially zero and therewith below the aforementioned field strength threshold.

In order to better allow a detection of the relatively weak backscattered electromagnetic response signal from the moving object, some embodiments suggest providing electrically non-conductive portions in an otherwise electrically conductive hull of the hollow electric conductor for passing the electromagnetic response signal to the magnetic core of the at least one sensor antenna inside the hollow conductor. Such non-conductive portions may be holes, slits, etc. in the hull of the hollow conductor. In other embodiments the non-conductive portions may also be provided by embedding non-conductive material in the otherwise conductive material of the hollow conductor. For possibly good detection results a position of the non-conductive portions should preferably correspond to a position of the magnetic core inside the hollow conductor. That is to say, there should be a positional overlap between the magnetic core inside the hollow conductor and the nonconductive portions in the hull. In some embodiments the electrically conductive hull may have portions that are thin enough to allow an entry of the electromagnetic response signal into the hull. That is to say, the thin portions may have a thickness of substantially less than the skin depth of the hull material at the frequency of the backscattered (alternating) electromagnetic response signal.

As has been mentioned in the introductory portion, embodiments may be particularly useful for goal detection purposes in sports games like soccer, handball, hockey, etc. For such embodiments the at least one exciting antenna may formed by a hollow goalpost and/or a crossbar of a goal. That is to say, the hollow goalpost or goal frame may function as the hollow conductor forming the exciting antenna loop. Correspondingly, the at least one magnetic core of the sensor antenna, and hence the sensor antenna loop, may be located inside the hollow goalpost.

In order to provide for the possibility to emit the exciting electromagnetic field, some embodiments of the exciter loop antenna may comprise a first and a second terminal for providing an excitation signal to the exciter loop antenna to generate the exciting electromagnetic field. Once provided to the exciter loop antenna, the excitation signal, which may be an electromagnetic signal of alternating current, may be transferred from the first terminal to the second terminal via a first signal path and a different second signal path of the exciter loop antenna. That is to say, the excitation signal may be split within the exciter loop antenna to propagate along two separate signal paths from the first terminal to the second terminal, where the split signal paths may be summed up again. That is to say, both signal paths may participate in the generation of the exciting electromagnetic field in that the magnetic field and the electric field generated by both signal paths is pointing in the same direction such as to enable constructive interference or superposition of both parts in an area of interest or detection area in the detection plane. According to some embodiments, the first and second signal paths may comprise a first and a second conductor segment, respectively. Each of the conductor segments may extend in parallel to the detection plane and on opposite sides thereof with an essentially identical distance to said detection plane. That is to say, detection plane may form a symmetry axis for the first and the second conductor segments. The resulting exciting electromagnetic field as generated by a superposition of the magnetic fields corresponding to the two signal paths may transit through the detection plane in a direction perpendicular to said detection plane with high field strength above said field strength threshold. It is worth noting that the preferably symmetrical two signal paths formed by the two conductor segments of the exciter loop antenna may form, at the same time, a sensor antenna loop spanning a sensor antenna plane which is essentially perpendicular to the detection plane.

Within a predefined area around an intersection of the detection plane and the sensor antenna plane, preferably in a symmetry center of the sensor antenna loop, the field strength of the generated exciting field will be essentially zero or at least below the field strength threshold. This is due to the essentially symmetrical arrangement of the two conductor segments around the detection plane, wherein the two conductor segment may form parts of the exciter antenna loop and parts of the sensor antenna loop at the same time in some embodiments. Therefore, embodiments suggest placing or locating the at least one magnetic core of the sensor antenna (formed by the two conductor segments) between the first and the second signal path within a predefined area around an intersection of the detection plane and the sensor antenna plane. In particular, the at least one magnetic core may be placed in the symmetry center of the two conductor segments.

A moving object energized by the exciting electromagnetic field, as for example an object comprising an RFID tag (RFID=Radio-Frequency IDentification) or the like, may experience a high field strength at the position where the transition through the detection area within detection plane occurs (due to the non-vanishing field component perpendicular to the detection plane). To this end, problems arising from configurations where the magnitude of the field strength of the exciting electromagnetic field experiences a minimum at this position may be avoided. According to some embodiments, a sports equipment such as a ball or the like may be utilized which may comprise three loop antennas arranged in a pairwise perpendicular orientation with respect to each other. The three antennas may be connected in series with a resonator, the resonator having a resonance frequency corresponding essentially to the frequency of the exciting electromagnetic field. Such a configuration, for example, may provide for the possibility to emit an electromagnetic field from the moving object by means of so-called back-scattering. When the moving object approaches the antenna system, current may be induced in the coils of the moving object and the received energy may be stored in the resonant circuit comprising the coils and, for example, a capacitor.

The stored energy may then generate a magnetic field in the perpendicular loop antennas which superimposes such that the exciting magnetic field is reflected in parallel and occurring with a delay corresponding to a phase shift of about 90° which is caused by properties of the resonator circuit. A phase shift of a component of the resultant backscattered magnetic field which is parallel to the detection plane may occur precisely when the moving object transits through the detection plane, allowing determining the transition of the moving object with high spatial resolution and in quasi real time.

An antenna system of some embodiments may optionally comprise a compensation signal generator coupled to the loop antenna in order to be able to balance the antenna in different environments, i.e., in order to be able to mount the antenna to various different support structures or goals. The compensation signal generator may be operable to compensate different currents in the first and second signal paths such that the currents in the first and second signal paths may become essentially equal. According to one embodiment, this may be achieved by a compensation signal path with adjustable coupling characteristics, which is coupled to the first signal path and/or the second signal path. That is to say, the coupling characteristics of the compensation signal path may be adjusted such as to achieve a balanced antenna, which is an antenna having identical currents in the first and second signal paths.

To this end, some embodiments may optionally employ compensation signal generators comprising a conductor wire which is essentially parallel to one of the first signal path or the second path, while the conductor wire may have at least one of an adjustable distance to the one signal path, an adjustable electrical resistance, an adjustable inductance and/or an adjustable capacitance. This may provide for the possibility to balance the antenna without the need to employ expensive and energy-consuming active circuitry. Embodiments of compensation signal generators may provide for the possibility to even mount the antenna system in close proximity to metallic surfaces, such as for example metallic posts or bars of goals, without losing the capability to clearly identify the electromagnetic signal of the moving object. Mounting the antenna system in the proximity of metallic surfaces or objects may generate eddy currents in the objects. These, in turn, may generate a disturbing magnetic field which superimposes to the response field of the movable object and also influences a current in the antenna loop(s), which may reduce the accuracy of the detection of a transit through the detection plane. Using a compensation signal generator, however, may compensate the effects of the disturbing magnetic field.

According to further embodiments, the antenna system may optionally comprise a further loop antenna at a border of the detection area (a goal frame), wherein the further loop antenna may be employed in parallel to the detection plane and perpendicular to the sensor antenna plane. That is to say, the further loop antenna may be utilized to make a further decision with respect to the position of the moving object. In particular, when the antenna system is used to determine the occurrence of a goal in a handball or soccer match, the further loop antenna may be utilized to decide, whether a ball, having transited through the detection plane, ended up inside the goal or outside the goal. To this end, the further loop antenna may be provided at the border of the detection area, e.g. at the border of the goal. Also the further loop antenna may be equipped with one or more magnetic cores, such as ferrite cores, for example.

According to some embodiments, a signal evaluator coupled to the signal terminal of the antenna system may, therefore, be operable to determine a signal indicative of the moving or movable object transiting through the detection area when a phase condition of the receive signal received at the signal terminal changes according to a predetermined condition. According to some embodiments, the predetermined condition is a phase shift from positive to negative or vice-versa. That is to say, embodiments of a method for determining the transit of a moving object through a detection area within a detection plane may comprise determining a component of interest of the magnetic field, the component of interest being parallel to the detection plane. The method may further comprise providing a signal indicative on the transit of the moving object through the detection area when a phase condition of the observed component of interest changes according to a predetermined condition.

According to some embodiments, an antenna system according to embodiments may be utilized to determine the transit of a moving object through an area surrounded by or associated to a support structure. To this end, the antenna system may further comprise or be coupled to a mounting structure adapted to mount the antenna system to a support structure such that the detection plane has a predetermined distance to a predetermined position at the support structure. According to some embodiments, where the antenna system may be utilized to determine the occurrence of a goal in a soccer match, the predetermined distance corresponds to half a diameter of a soccer ball wherein the support structure to which the antenna system is mounted may be a post or a bar of the soccer goal itself. To this end, the predetermined distance may be half a diameter of the ball, wherein the predetermined position at the support structure may be the open face of the goal facing away from the soccer field.

According to some embodiments, the resonance frequency of a resonator of a movable sports equipment being observed by antenna systems according to embodiments may be from the range of 10 kHz to 1.5 MHZ in order to avoid a disturbance or interference to the system due to the presence of human beings in the proximity of the antenna system.

BRIEF DESCRIPTION OF THE DRAWINGS

Some embodiments of apparatuses and/or methods will be described in the following by way of example only, and with reference to the accompanying figures, in which.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of embodiments. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein. For example, terms like "essentially" or "substantially" typically refer to deviations from the ideal world, wherein such deviations may be due to production and/or installation tolerances and variations.

Figure 1:
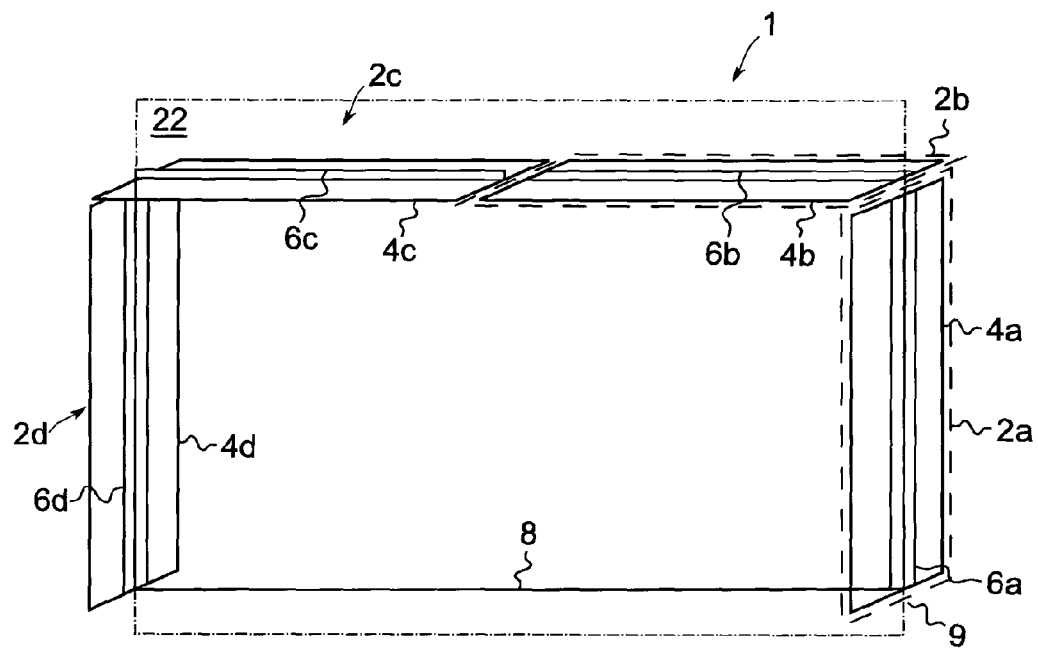
FIG. 1 shows a schematic view of a goal of a soccer field having mounted thereto an embodiment of an antenna system.

FIG. 1 shows a schematic view of a goal 1, e.g. of a soccer game, having mounted thereto four antenna systems 2a-d according to an embodiment. Although the goal 1 is surrounded by four antenna systems 2a-d in FIG. 1, other embodiments may also utilize different amounts of antenna systems. For example, in a further embodiment, only one antenna system may be used, either at one of the posts of the goal 1 or at the top bar of the goal 1, for example. In the embodiment of FIG. 1 the antenna system 2a-d serves to determine the transit of a ball through an area of interest or a detection area within a detection plane 22. In the configuration of FIG. 1, the detection plane 22 is the plane perpendicular to loop antennas 4a-d of the antenna systems 2a-d and, therefore, parallel to or coinciding with the open front face of the goal 1.

As will be elaborated in the following description, the loop antennas 4a-d may be used for the detection of the crossing or of the transit of a ball 11 through the detection plane 22 in some embodiments. Therefore, the loop antennas 4a-d may also be denoted as goal line or sensor antennas in some embodiments. The exemplary embodiment of FIG. 1 also comprises a further loop antenna 6a-d in each of the antenna systems 2a-d, which may comprise one or more antenna loops arranged within a further antenna plane which is perpendicular to the antenna plane of the sensor loop antennas 4a to 4d and parallel to the detection plane 22. These further loop antennas may serve for deriving information whether the ball 11 has passed through the detection plane 22 inside the goal 1 or outside of the goal 1. Therefore, the further loop antennas 6a-d may also be denoted as frame antennas. In other words, the frame antennas may serve to define a detection area within the detection plane, in order to be able to conclude whether the ball 11 crossed the detection plane within the detection area. Therefore, the further loop antennas 6a-d may be situated at the border of the detection area, for example, at the goal posts of the goal frame. As will become clear in the sequel, all antennas or antenna loops may be arranged at the border of the border of the detection area.

Figure 2:
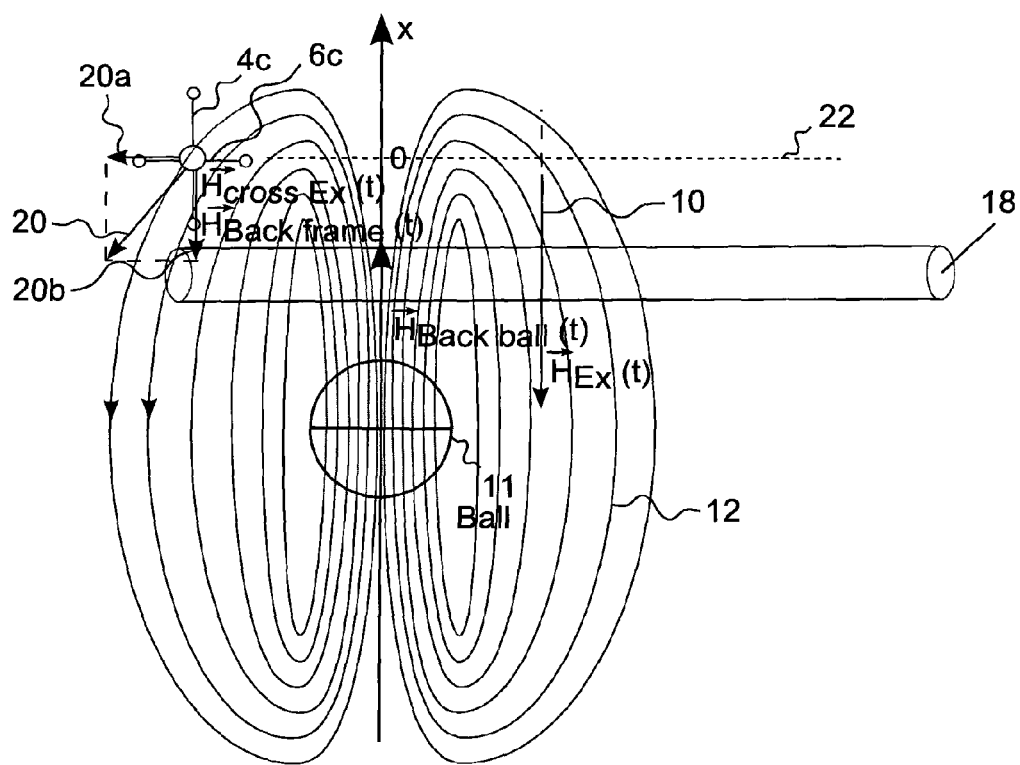
FIG. 2 shows a side view of a section of the antenna system as attached to the goal.

FIG. 1 further illustrates schematically a ground loop signal path 8, which serves to interconnect first and second terminals of the loop antennas 4a-d such as to close a conductive loop around the detection area in order to generate an exciting electromagnetic field as illustrated in FIG. 2. Within the detection area the exciting electromagnetic field 12 or at least a spatial component thereof (e.g. perpendicular to the detection plane) shall have a (magnetic) field strength above a certain field strength threshold, wherein the threshold may be in the range from 0.01 A/m to 10 A/m. That is to say, the ground loop signal path 8 closes an electrical circuit in order to enable the generation of the exciting electromagnetic field with the loop antennas 2a-d which also form an exciter loop antenna around the detection area, i.e. the goal 1.

Although some embodiments illustrated herein utilize conductor paths of the sensor loop antennas 4a-d to also generate the exciting electromagnetic field by applying an excitation signal to said loop antennas 4a-4d, other embodiments may as well utilize a separate excitation or exciter loop in order to provide the exciting electromagnetic field. Although not explicitly shown by FIG. 1, the sensor loop antennas 4a-4d may comprise magnetic cores, such as ferrite cores, according to some embodiments. Thereby the magnetic cores may be positioned in a region of the exciting electromagnetic field or in a region of the detection plane where the field strength is below the aforementioned field strength threshold.

In the following, the operating principles of the antenna system and of the determination of the presence of a crossing or of a transit of a moving object 11 through the detection area within the detection plane 22 will be explained in more detail.

Referring now to FIG. 2, an exciting electromagnetic field, which may have filed lines of the magnetic component that cross the detection plane 22 essentially perpendicular, may be generated with an antenna system according to embodiments. The exciting electromagnetic field 10 or, to be more precise, its magnetic component is only illustrated schematically by indicating the direction of a single field line 10 in FIG. 2. Note that the other two magnetic components parallel to the detection plane 22 may vanish in the detection plane.

Utilizing a movable or moving object 11 emitting or backscattering a magnetic field 12 as illustrated in FIG. 2, the magnetic component 12 of the emitted or backscattered electromagnetic field may be received by means of the sensor loop antennas 4a-d. FIG. 2 assumes the moving object 11 to be a ball of sports game which emits or reflects the magnetic field as illustrated by the shown field lines 12.

Figure 14:
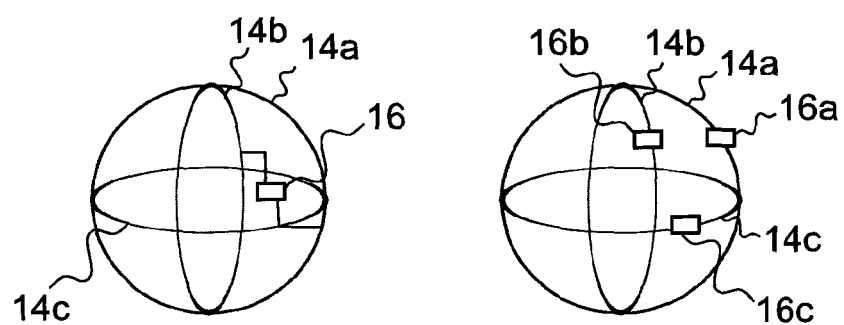
FIG. 14 shows an embodiment of a sports equipment operable to emit an electromagnetic field.

Embodiments described herein, however, utilize a ball 11 or a moving object which is excited by the exciting electromagnetic field 10 as generated by an exciter loop antenna 9 formed by the interconnected loop antennas 4a-d and the ground loop signal path 8 to emit the magnetic field 12. To this end, a ball or a moving object 11 as shown in FIG. 14, left illustration, may be utilized, which may comprises three loop antennas 14a-c being arranged in a pairwise perpendicular orientation with respect to each other. The three loop antennas 14a-c may be connected to each other and coupled to a resonator 16, the resonator 16 having a resonance frequency corresponding essentially to the frequency of the exciting electromagnetic field 10. That is to say, the object 11 may have three perpendicular coils 14a-c with a resonance frequency essentially corresponding to the frequency of the exciting electromagnetic field 10, wherein tolerances of ±10% are possible.

When such a ball or object 11 approaches the goal 1 or the antenna system 2a-d, the coils 14a-c inside the ball 11 are stimulated by the exciting electromagnetic field 10, in particular by the non-vanishing field component perpendicular to the detection plane 22. That is to say, a current is induced in the loop antennas 14a-c of the ball. Due to the resonance frequency of the resonator of the moving object 11 and the corresponding frequency of the exciting electromagnetic field 10, the received energy may be stored by means of the resonant circuit or the resonator 16 of the moving object 11, e.g. in a capacitor used therein. The oscillation in the resonator 16 or the stored energy may then generate a backscattered electromagnetic field in the coils 14a-c of the moving object 11, which superimposes such that the exciting magnetic field is reflected in parallel and occurring with a delay corresponding to a phase shift of 90° which is caused by properties of the resonator circuit.

According to some embodiments, the moving object 11 may comprise three loop antennas or coils 14a-c arranged in a pairwise perpendicular orientation with respect to each other and which are not connected in series, as indicated by the right illustration in FIG. 14. Each loop antenna or coil 14a-c of the moving object 11 may form an independent resonator which may further comprise an associated capacitance 16a-c being connected in series or in parallel. Each of the three so provided resonant circuits may be tuned to the frequency of the exciting electromagnetic field 10 by choosing the capacitances and the inductances of each resonant circuit appropriately.

Figure 3:
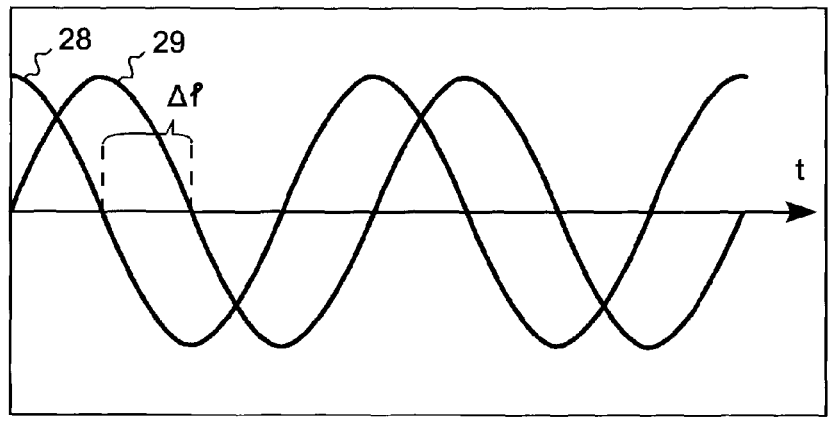
FIG. 3 shows an example of idealized signal characteristics of an excitation signal and a receive signal.

Due to the properties of the resonator, the magnetic field 12 emitted by the moving object 11 may be delayed with respect to the exciting electromagnetic 10 field by a time ideally corresponding to a phase shift of 90° ($\pi/2$). This stimulation of the emission of a magnetic field 12 is also utilized in Radio Frequency Identification systems (RFID) in order to transmit information from objects not having embodied own energy sources. In RFID, the excited emission of a magnetic field 12 as illustrated in FIG. 2 is also known as "backscattering". The backscattered or emitted (electro-) magnetic field 12 of the moving object 11 may, amongst others, be received by the sensor loop antenna 4c which may be mounted behind a goal post or a crossbar 18 of the goal 1. While the sensor loop antennas 4a-d of the exemplary antenna systems described herein may only comprise one single antenna loop formed by two symmetric signal paths, other embodiments may also utilize loop antennas having more loops. FIG. 3 illustrates an idealized phase relation between an excitation signal 28 used to generate the exciting electromagnetic field 10 and a backscattered receive signal 29 as it may be received at a signal terminal of the sensor loop antenna 4c.

Utilizing a moving object 11 as, for example the one illustrated in FIG. 14, leads to a field configuration of the magnetic field 12 emitted by the moving object 11 as illustrated in FIG. 2. This is due to the cause that the individual electromagnetic fields emitted by the three loop antennas 14a-c superimpose with each other such as to arrive at the field configuration of FIG. 2. One exemplary field strength vector 20 of the emitted magnetic field 12 is illustrated in FIG. 2, which is composed of a first component 20a in parallel to the detection plane 22 as well as of a second component 20b perpendicular to the detection plane 22. Due to its orientation with an opening surface perpendicular to the detection plane 22, the sensor loop antenna 4c is sensitive to the first component 20a, which is, therefore, also denoted as the goal line part, whereas the second component 20b is also denoted as the frame part of the field strength vector 20 ($H_{back,ball}$).

In other words, the backscattered electromagnetic response signal of the moving object 11 or the ball is inducing a current into the sensor loop antenna 4c and the further loop antenna 6c of the antenna system 2c, which may both be formed as ferrite antennas, i.e. antennas utilizing a magnetic core. The further loop antenna 6c is only illustrated schematically and for the sake of completeness in FIG. 2. The backscattered or received response signal can be split into a frame part 20b and a goal line part 20a. Depending on the position of the ball 11, the orientation of the H-field vector 20 of the backscattered response signal is changing. As soon as the ball 11 passes the detection plane 22 at the center (or symmetry axis) of the loop antenna 4c, the first component 20a of the field strength vector ($H_{back,goal}$) crosses zero and the signal waveform is inverted. That is to say, a phase condition of the receive signal changes according to a predetermined condition. The predetermined condition may be, according to some embodiments, that the signal waveform is inverted and that the phase undergoes a change of 180°. Once a phase inversion or a phase shift of 180° occurs or is determined by evaluation of the received response signal provided by the antenna system 2c, in particular by the loop antenna 4c, an event "goal" can be assumed, as the center of the ball or of the moving object 11 crossed the line of symmetry of the two signal paths (each forming half of the sensor loop) of the loop antenna 4c, i.e., the detection plane 22. However, at the time of the crossing, the overall field strength of the exciting electromagnetic field 12 (i.e. of its non-vanishing spatial component perpendicular to the detection plane 22) within the goal 1 is at maximum and, therefore, the emission of the magnetic field 12 of the moving object 11 is maintained, increasing the achievable precision in the determination of the transit of the object 11 as compared to alternative approaches, where the exciting electromagnetic field within the detection plane 10 is tuned or adjusted to be zero.

Utilizing an antenna system according to embodiments, therefore, allows determining the occurrence of a goal, i.e., the fact that the complete ball 11 was, at any time instance, completely behind the goal line, with highest precision. Magnetic cores in the sensor loops 4c and/or 6c may further improve signal detection capabilities.

For the detection of a goal in a soccer game, the antenna system 4c may comprise a mounting structure operable to mount the antenna system 2a to 2d to a support structure or to the goal frame such that the detection plane 22 has a distance substantially equaling half a diameter of a soccer ball to the front face of the goal 1. In order to provide a more flexible solution, the mounting structure may be adjustable to fit different designs of goals, such as to be able to adjust the predetermined distance to the requirements.

Figure 4A:
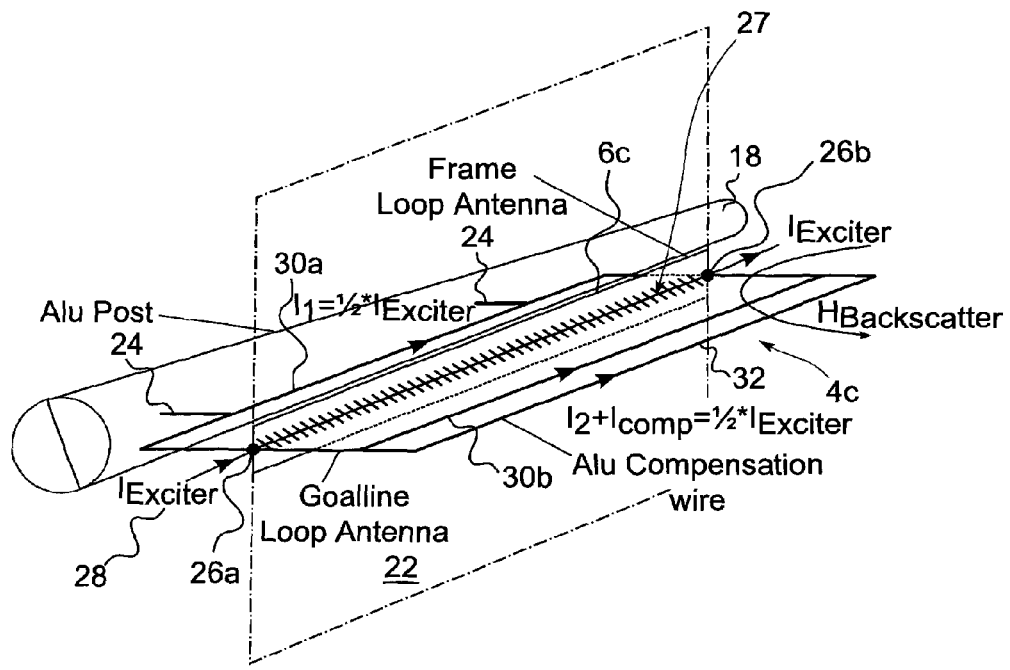
FIG. 4a shows a perspective view of an embodiment of an antenna system as mounted to a goal.

FIG. 4a shows a perspective view of the configuration illustrated in FIG. 2, wherein an embodiment of a mounting structure 24 adapted to mount the antenna system comprising the sensor loop antenna 4c and the further loop antenna 6c to the aluminum bar 18 of a goal is illustrated only schematically.

As further illustrated in FIG. 4a, the sensor loop antenna 4c (being part of the whole exciter antenna loop 9) comprises a first terminal 26a (towards sensor loop antenna 4b) and a second terminal 26b (towards sensor loop antenna 4d) in order to receive an excitation signal 28 of the exciter antenna loop 9, which allows providing said excitation signal 28 to the essentially symmetric sensor loop antenna 4c. As illustrated in more detail in FIG. 4a, the excitation signal 28 of alternating current may be split and transferred (propagated) from the first terminal 26a to the second terminal 26b via a first signal path 30a as well as via a second signal path 30b of the sensor loop antenna 4c. That is, both conductors of the loop antenna 4c which essentially extend in parallel to the detection plane 22 (forming a symmetry plane for the first and the second signal paths 30a, b) may participate in the generation of the exciting electromagnetic field 10. According to the embodiment of FIG. 4a, the further loop antenna 6c, i.e., the frame antenna, does not participate in the generation of the electromagnetic field 10. However, further embodiments may also utilize the further loop antenna 6c for the generation of the exciting electromagnetic field 10.

Note that an intersection region 27 between the detection plane 22 and the sensor antenna plane spanned by the sensor loop antenna 4c is a region where the magnetic field strength of the generated exciting (electro-) magnetic field 10 will be weak, ideally zero, due to the symmetry of the first and the second signal paths 30a, b with respect to the detection plane 22. Hence, the region 27 is a region of destructive superposition of electromagnetic field components originating from a symmetrical arrangement of one or more electrical conductors 30a, b of the exciter antenna 9. That is to say, the intersection region 27 between the detection plane 22 and the sensor antenna plane spanned by first and the second signal path 30a, b forms a region of the alternating exciting electromagnetic field 10 where a magnetic field strength of the alternating field is below or equal to a certain magnetic field strength threshold. This magnetic field strength threshold may, in an ideal case, be at least close to zero. The (magnetic) field strength threshold may be defined to be in the range the range from 0.01 A/m to 10 A/m, for example. According to some embodiments a magnetic core material, such as a ferro- or ferrimagnetic material, may be placed or positioned in said intersection region 27 between the detection plane 22 and the sensor antenna plane spanned by the sensor loop antenna 4c. Thereby a longitudinal axis of the magnetic core may extend in parallel to the detection plane 22. In particular, the longitudinal axis of the magnetic core may coincide with or be located in the detection plane 22. A detection capability of the sensor loop antenna 4c with respect to the relatively weak backscattered (electro-) magnetic response signal may be improved due to the magnetic core of the sensor loop antenna 4c. Note that the region 27 may be outside the detection area, e.g. the goal opening surface.

Embodiments of a sensor loop antenna 4c comprising a magnetic core in the region 27 of the exciting electromagnetic field experiencing a field strength below the field strength threshold will be described in more detail with respect to FIGS. 5a and 5b.

Figure 5A:
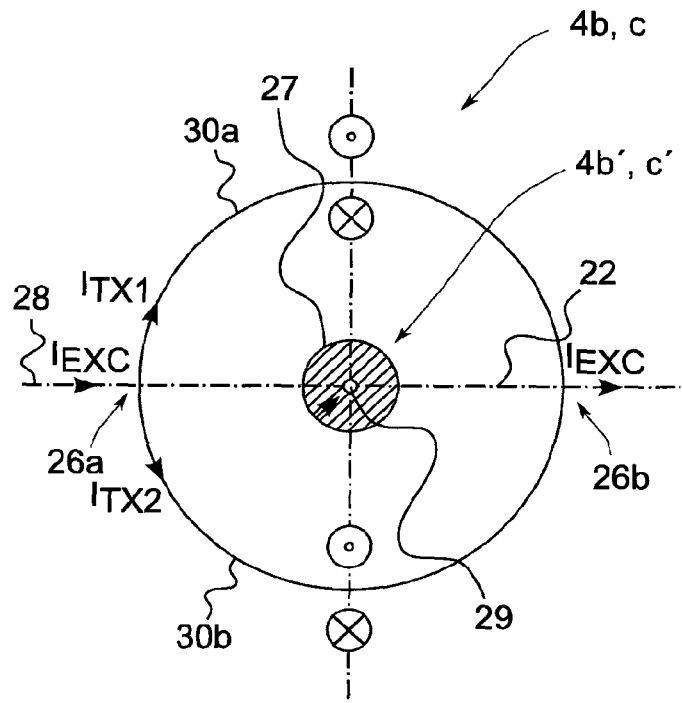
FIG. 5a, b, c show embodiments of sensor loop antennas comprising a magnetic core in the region of the detection plane.
Figure 5B:
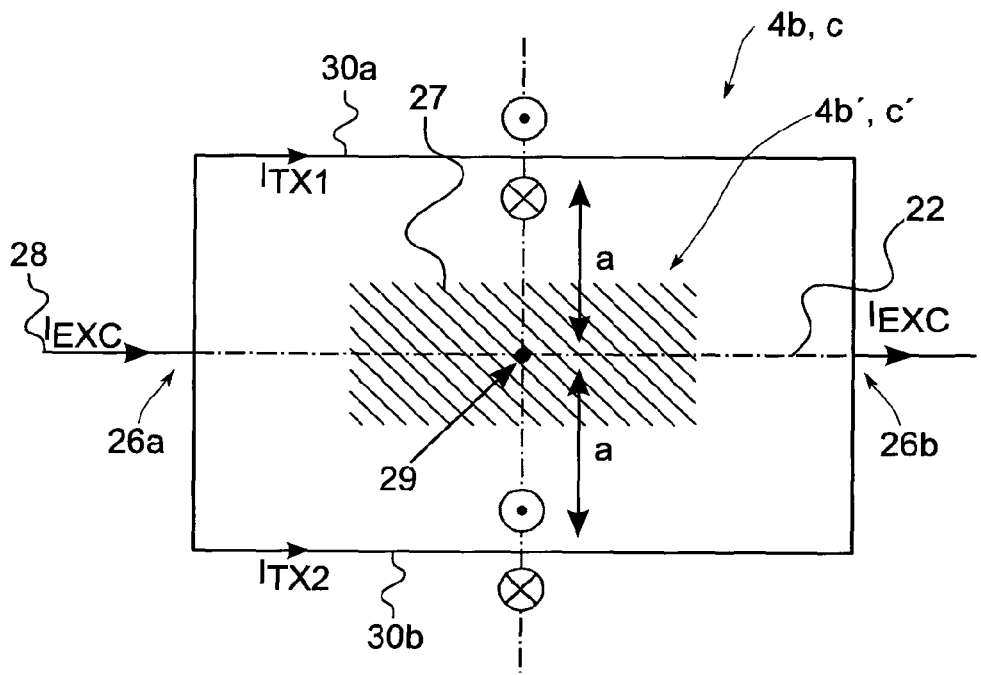

FIG. 5a illustrates a portion of the exciter loop antenna 9, the exciter loop antenna 9 surrounding the detection area (e.g. a goal frame), and the portion forming an antenna sensor loop 4c of the antenna system at the same time. The sensor loop antenna 4c is coupled to a first signal terminal 26a and to a second signal terminal 26b. The excitation signal or current 28 ($I_{EXC}$) is transferable from the first terminal 26a to the second terminal 26b via a first signal path 30a and via a different second signal path 30b of the exciter or sensor loop antenna. Thereby the first signal path 30a carries a first portion $I_{TX1}$ of the excitation current $I_{EXC}$, the second signal path 30b carries a second portion $I_{TX2}$ of the excitation current $I_{EXC}$. Ideally, the first and the second portions $I_{TX1}$, $I_{TX2}$ of the excitation current $I_{EXC}$ are identical in amplitude and phase. According to some embodiments the first and the second signal path 30a, 30b extend symmetrically and on different sides of the detection plane 22. This symmetry of the first and the second signal path 30a, 30b with respect to the detection plane 22 advantageously leads to the region 27 of the exciting electromagnetic field below a certain magnetic field strength threshold. In the symmetry center 29 of the symmetrically arranged first and second signal path 30a, 30b the magnetic field strength of the exciting electromagnetic field is ideally zero. As has been explained before, the first and the second signal path 30a, 30b span a sensor antenna plane being essentially perpendicular to the detection plane 22. While FIG. 5a illustrates an embodiment with a circular exciter/sensor loop antenna 4c, i.e., each of the first and second signal path 30a, 30b forming a half-circle, FIG. 5b illustrates a further embodiment wherein the first signal path 30a comprises a first electrical conductor segment extending in parallel to the detection plane 22 and wherein the second signal path 30b comprises a second conductor segment also extending in parallel to the detection plane 22 but on a different side thereof. Hence, in FIG. 5b the exciter/sensor loop antenna 4c has an essentially rectangular geometry. In both embodiments the antenna system is configured such that the excitation signal 28 propagates from the first terminal 26a to the second terminal 26b via the first signal path 30a and the second signal path 30b simultaneously and in phase. Further, in both embodiments at least one magnetic core of the sensor loop antenna 4c may be located in between the first and the second signal path 30a, 30b within the predefined area 27 around an intersection of the detection plane 22 and the sensor antenna plane. That is to say, the magnetic core 31 may substantially be located in the detection plane 22. Due to the symmetrical arrangement of the two signal paths 30a, 30b the predefined area 27 around the detection plane 22 will experience only a weak exciting magnetic field below the magnetic field strength threshold, thereby avoiding saturation effects in the magnetic core 31 of the sensor loop 4c. This in turn allows sensitive detection of the relatively weak backscattered response signal from the movable object 11.

Figure 4B:
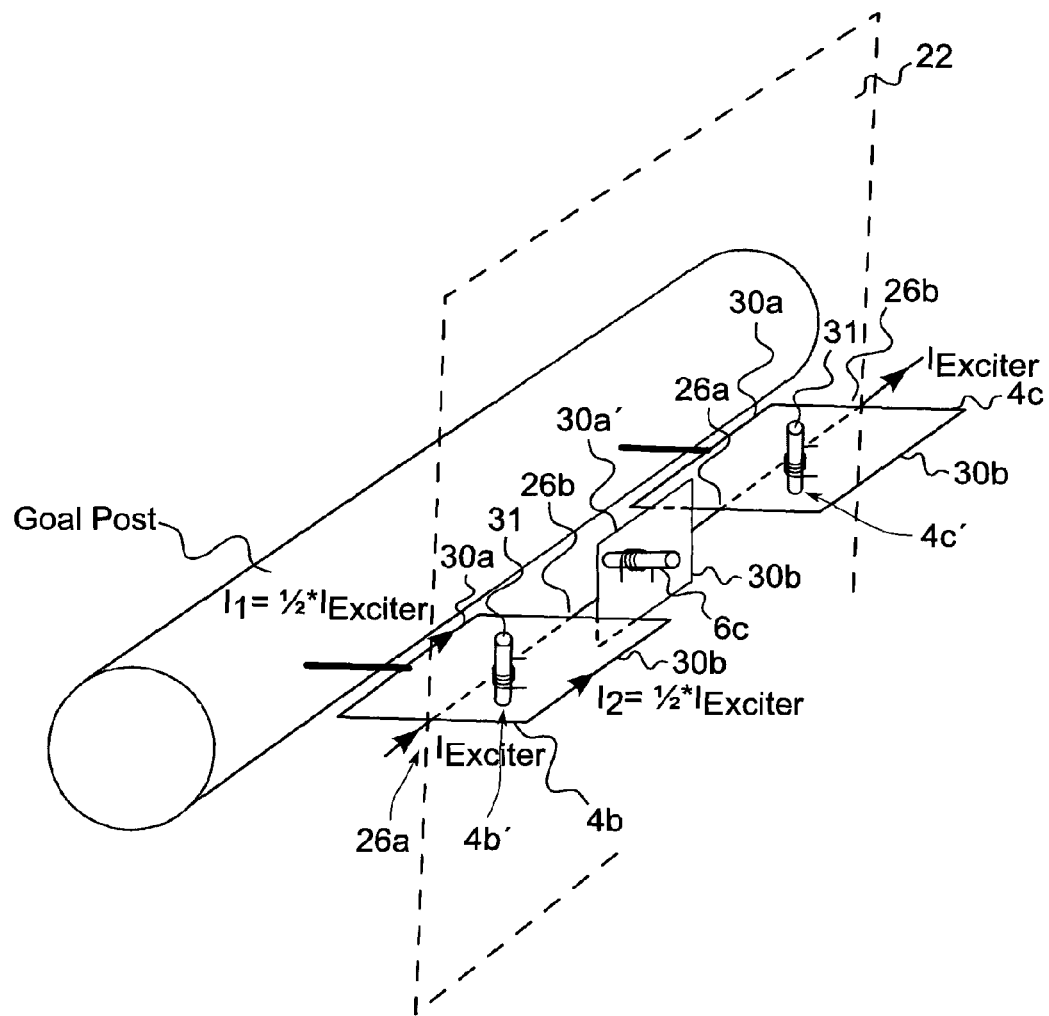
FIG. 4b shows a perspective view of a further embodiment of an antenna system as mounted to a goal.
Figure 5C:
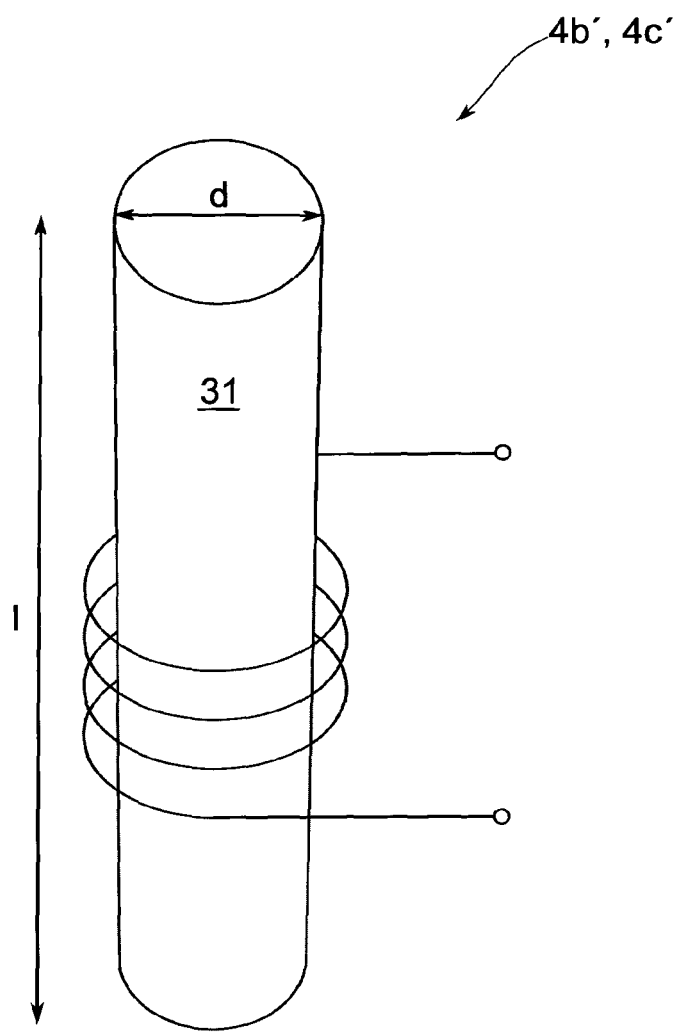

FIGS. 4b and 5c illustrate a further embodiment, wherein loop antennas 4b and 4c form exciter loop antennas with first and second symmetrical signal paths 30a, 30b, respectively, as has been explained before. In contrast to the embodiment of FIG. 4a, the embodiment of FIG. 4b employs sensor loop antennas 4b' and 4c' which are separate from the exciter loop antennas 4b and 4c. However, the sensor loop antennas 4b' and 4c', each comprising a magnetic core 31, may also be located in between the first and the second signal path 30a, 30b within the predefined area 27 around an intersection of the detection plane 22 and the sensor antenna plane. That is to say, the sensor loop antennas 4b' and 4c' with their respective magnetic cores 31 may substantially be located in the detection plane 22. Due to the symmetrical arrangement of the two signal paths 30a, 30b the detection plane 22 behind the goal bar will experience only a weak exciting magnetic field below the magnetic field strength threshold, thereby avoiding saturation effects in the magnetic cores 31 of the sensor loops 4b', 4c'. This in turn allows sensitive detection of the relatively weak backscattered response signal from the movable object 11. As can be seen from FIG. 4b, the longitudinal axis of the magnetic cores 31 may essentially extend within the detection plane 22 and perpendicular to the antenna plane spanned by the loop antennas 4b and 4c or the signal paths 30a, 30b thereof. An enlarged view of a sensor antenna 4b' or 4c' comprising a magnetic core 31 with a large length-to-diameter ratio l/d is illustrated in FIG. 5c. The embodiment of FIG. 4b further shows a frame antenna 6c located in between the two (exciter) loop antennas 4b and 4c. Thereby a setup for the frame antenna 6c is similar to that of the sensor loop antennas 4b' and 4c'—except that it is turned by 90°. That is to say, the frame antenna 6c comprising a magnetic core 31 may also be located in between symmetric first and second signal paths 30a', 30b', however, with the difference that the plane spanned by the signal paths 30a', 30b' corresponds to the detection plane 22 and that the longitudinal axis of the frame antenna loop's magnetic core extends perpendicular to the detection plane 22.

Embodiments allow circumventing specific disadvantageous factors, such as (magnetic) saturation, which normally prohibit the usage of ferromagnetic materials in sensor applications with neighboring large or high magnetic fields. Due to the special geometry (e.g. core materials in sensor applications, such as amplification of the receive signal. By using ferro- or ferrimagnetic core materials in conjunction with an adequate antenna setup the receive signal can be better amplified by either employing the same surface of the sensor loop antennas as without magnetic core, or the dimensions of the antenna setup may be scaled down still leading to a conventionally received magnitude of the receive signal (miniaturization).

Figure 6A:
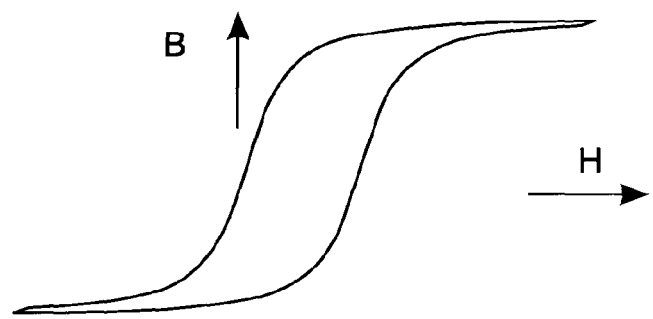
FIG. 6a illustrates an exemplary magnetization curve of a magnetic core material.
Figure 6B:
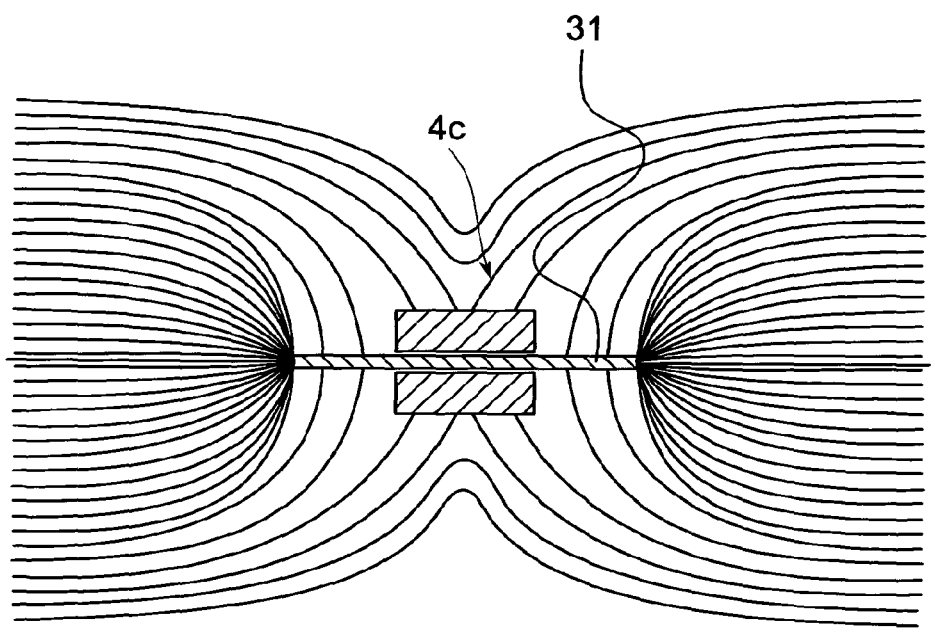
FIG. 6b exemplarily shows intense magnetic field lines originating from a ferromagnetic core of a loop antenna.

Magnetic core materials typically have a magnetization curve as schematically illustrated in FIG. 6a. If the magnetic core is brought into a magnetic field H exceeding a certain magnetic field strength, the ferromagnetic material will be driven into saturation. That is to say, a further increase of the magnetic field strength H will lead to only a minor increase of the magnetic flux B in the magnetic core material and hence of the receive signal. Normally there will be a non-linearity leading to signal distortions. Hence, for using ferro- or ferrimagnetic antennas as magnetic field sensors for alternating fields it is important to have the magnetic core in a rather linear region, not leading to saturation. This helps to use the focusing effect of the magnetic core, i.e., the increase of the magnetic flux B through the core. To illustrate this FIG. 6b exemplarily shows intense magnetic field lines originating from a ferromagnetic core 31 of a loop antenna 4c.

Having large distances between sender and receiver, as it is usually the case for DCF77 signals (DCF77 stands for D=Deutschland (Germany), C=long wave signal, F=the longwave transmitters on the premises of the transmitting station Mainflingen (due to its vicinity to Frankfurt am Main), 77=frequency: 77.5 kHz), for example, using magnetic cores in receive antenna poses no problems as the magnetic field strength at the receive antenna is usually rather weak. For goal detection applications, however, the exciting (electro-) magnetic field is generated nearly at the same location where the comparatively weak response signal is received. That is to say, in the region of the sensor antenna 4c strong excitation magnetic field strengths compared to the backscattered response signal may be experienced. A relation between the field strengths of the excitation field and the response field may be in a range between 50 dB to 110 dB, for example. Hence, normally the strong excitation field 10 would drive a (ferro-) magnetic core of a receive antenna into saturation. However, embodiments suggest providing a field-free or at least almost field-free region 27 which is effectively not influenced by the excitation field. Therefore, embodiments allow using sensor antennas 4a-d with magnetic cores 31.

As has been explained with reference to FIGS. 4 and 5 the field-free region or region 27 of the exciting electromagnetic field 10 below the field strength threshold may e.g. be created, for example, if the excitation signal 28 is split up into two symmetric and/or parallel signal paths 30a, 30b. If the same current (in amplitude and phase) passes through both signal paths 30a, 30b, the field-free region 27 is created at and around the symmetry center 29 of the two signal paths 30a, 30b due to destructive superposition of the individual magnetic fields generated by the two signal paths 30a, 30b or currents $I_{TX1}$, $I_{TX2}$, respectively. If it is assumed that a certain tolerance is allowed, i.e., that the superimposed magnetic field may not be exactly zero but below a certain field strength threshold, then there is a certain region 27 around the symmetry center 29 in which the magnetic core 31 of the sensor antenna 4c may be placed. Assuming a symmetrical arrangement around the symmetry center 29 the sum integral of the enclosed magnetic field remains zero or at least close to zero. If the dimensions (e.g. the diameter) of the magnetic core 31 are substantially smaller than those of the sensor loop 4c, a magnetic flux through the core 31 of essentially zero may be assumed.

Figure 7:
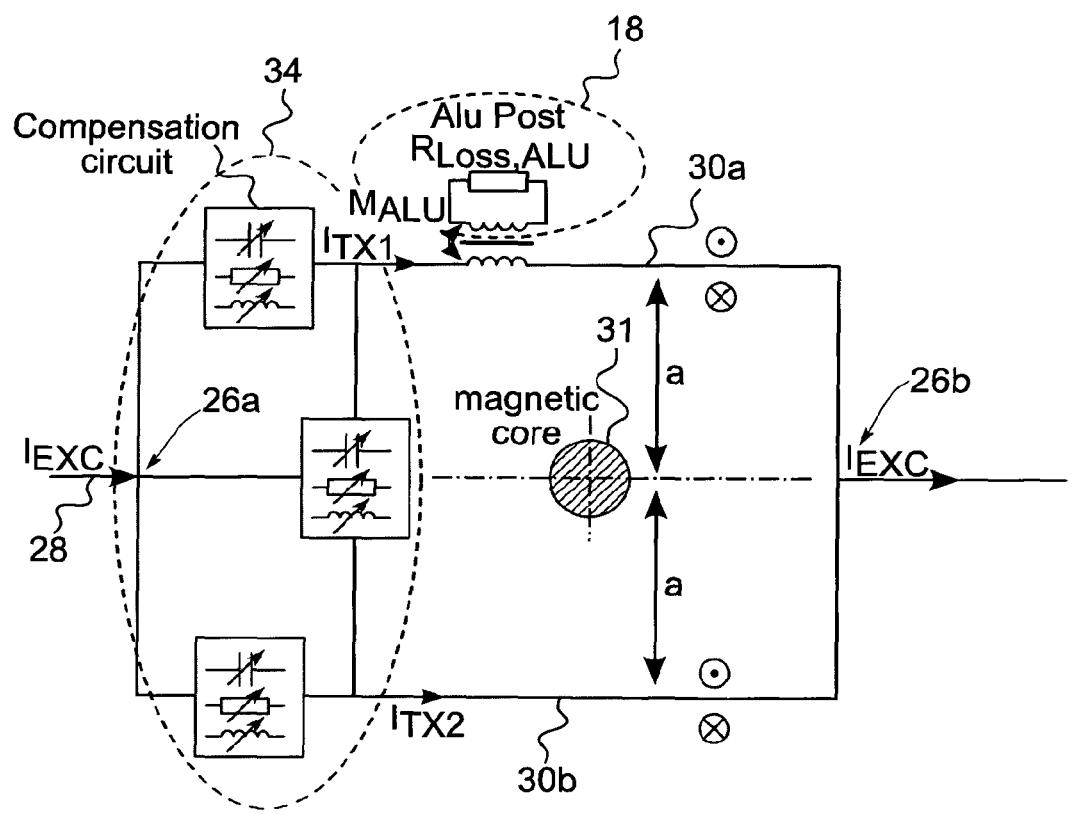
FIG. 7 shows an embodiment of a sensor loop antenna with compensation circuitry

In embodiments using the antenna system 2a-d for goal detection, the system may be mounted to metallic goal posts (e.g. aluminum). In such scenarios a compensation circuit may be employed for balancing the two currents $I_{TX1}$ and $I_{TX2}$ in amplitude and phase. Turning back to FIG. 4a it is further illustrated an optional and exemplary compensation signal path 32 (which may as well be employed to the embodiment of FIG. 4b), which may be coupled to the second signal path 30b and which may serve to balance the loop antenna 4c. In alternative embodiments, the compensation signal path 32 may, of course, also be coupled to the first signal path 30a. Generally, a compensation circuit, which may be coupled to the first and/or the second signal path 30a, 30b, may comprise variable resistive, capacitive and/or inductive components for balancing the two currents $I_{TX1}$ and $I_{TX2}$ in the presence of unbalancing effects caused by, for example, metallic posts or the like in vicinity to the antenna system 2a-d. A further embodiment of a compensation circuit 34 is schematically illustrated in FIG. 7. Thereby variable resistive, capacitive and/or inductive components of the compensation circuit 34 may be positioned in the first signal path 30a, in the second signal path 30b, and in between the first and the second signal path 30a, 30b in order to balance the currents $I_{TX1}$ and $I_{TX2}$. An influence of a metallic post 18 is modeled by means of an electric resistance $R_{loss,Alu}$ and a transformer having a mutual inductance $M_{Alu}$ between the metallic post 18 and the first signal path 30a.

In case of an asymmetric distribution of the currents $I_{TX1}$ and $I_{TX2}$ it would also be possible to determine the resulting location of the (nearly) field-free region 27. Having amplitude differences between the currents $I_{TX1}$ and $I_{TX2}$ the point 29 of destructive superposition of the individual resulting magnetic fields would be shifted out of the symmetry center 29 to another position within the sensor loop 4c. That is to say, also embodiments without compensation circuits are possible. In order to have controlled and predictable conditions, however, compensation of imbalances is possible.

Turning back to FIG. 4a, the compensation signal path 32 may have adjustable coupling characteristics with respect to the second signal path 30b. This may be utilized to compensate for field components generated by eddy currents in metallic posts such as for example in an aluminum post 18 illustrated in FIG. 4a, b. The eddy currents may, for example, be generated by the current in the first signal path 30a and, hence, induce a current into the loop antenna 4c which is not caused by the moving object 11 and, therefore, undesirable. By means of the compensation signal path 32, or, more generally, by using a compensation signal generator 34 (such as shown in FIG. 7) within the antenna system 2c, such signal components may be compensated so that the antenna is balanced, i.e., one of the signal paths 30a or 30b carries half of the current $I_{EXC}$ of the excitation signal 28, while the other signal path, possibly together with the compensation signal path 32 or with the compensation signal generator carries the other half of the current, such that no signal is induced in the loop antenna 4c without the presence of the moving object 11 in the proximity of the loop antenna 4c. To this end, the loop antenna 4c may be tuned such that the both signals carrying half of the current $I_{EXC}$ each are in phase.

FIG. 4a only exemplarily shows one particular embodiment to implement a compensation signal generator by using a compensation wire having an adjustable distance to the wire of the second signal path 30b and/or an adjustable inductance so that the antenna can be balanced by adjusting the distance and/or the inductance once the antenna is mounted to the support structure or to the goal. A further possibility to implement a compensation signal generator would, for example, be to add a symmetric metal or aluminum part on the other side of the antenna system 2c such as to provide a symmetric configuration in which the eddy currents of the different metal bars compensate each other. A further possibility to implement a compensation signal generator would, for example, be to induce a current into the loop antenna 4c or into one signal path of the loop antenna 4c with an appropriately adjusted amplitude and phase generated such that the influence of the eddy current is compensated for. The induction of this additional compensation signal could, for example, be performed by means of a further transformer or the like. However, when using a compensation signal path 32 or a compensation wire as illustrated in FIG. 4a, and, in more detail in FIG. 7, no further active signal path is necessary and, hence, the antenna system remains simple and reliable.

Apart from the use of the compensation signal generator or the compensation signal path 32, the antenna system design is also highly efficient in avoiding cross-talk or undesired signal components as compared to other solutions employing an additional independent loop for the generation of the exciting electromagnetic field 10. Using an additional loop may generate cross-talk signals in the loop antenna 4c of the antenna system 2c which might cover the magnetic field 12 of the backscatter signal of the moving object 11. This would decrease the accuracy of the detection of the occurrence of a goal significantly. However, utilizing the loop antenna to create the exciting electromagnetic field as in the embodiments described in the Figs. avoids the occurrence of cross-talk signals due to the particular generation of the exciting electromagnetic field 10.

Figure 8:
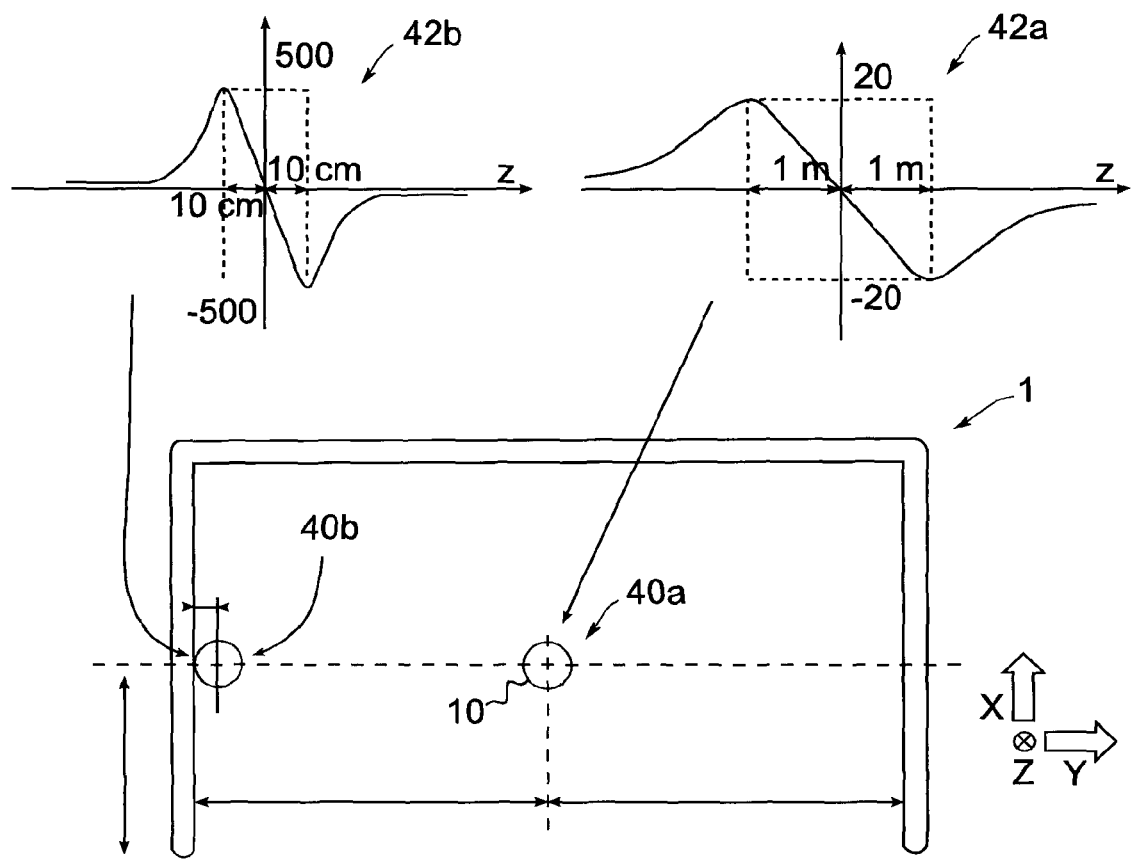
FIG. 8 shows a schematic view of a goal equipped with an embodiment of an antenna system and an illustration of the determined receive signals.

FIG. 8 shows, by way of example, two receive signals 42a and 42b as they may be received by the loop antenna 4c when a ball 10 passes a detection plane 22 of a goal 1 such that a score is achieved in a soccer or handball game or the like. FIG. 8 schematically shows a goal and the receive signals 42a and 42b resulting from two different positions where a ball passes the detection plane 22. The first position 40a is essentially in the center of the goal 1 while the second position 40b is close to a post of the goal 1. The coordinate system is chosen to be such that the X direction is the direction from the bottom to the top bar of the goal, while the Y direction extends from the left to the right and the Z direction is perpendicular to the paper plane, that is, perpendicular to the detection plane, which is parallel to the plane of the open face of the goal.

The two signal characteristics of receive signals 42a and 42b as determined by an embodiment of the antenna system are shown on top of the goal 1. The geometry is chosen such that the plane having a Z-coordinate of zero corresponds to the detection plane. As already explained in the foregoing, a receive signal 42a and 42b as determined by antenna systems according to embodiments undergoes a phase change, i.e., crosses zero when the ball crosses or passes through the detection plane 22. Although the amplitudes of the receive signals 42a and 42b and the distance to the detection plane 22 that corresponds to the occurrence of a detectable receive signal (in terms of a significant amplitude produced by the moving object) may differ significantly, it becomes apparent, that irrespective of the position where the ball passes through the detection plane 22, the phase change precisely occurs at the position of the detection plane 22, i.e. z=0. This is particularly due to the geometry of the loop antennas 4a-d of the antenna system, in particular due to their orientation with respect to the detection plane and due to the generation of the exciting electromagnetic field 10 by the loop antennas. Therefore, the reliable detection of a goal can be achieved over the complete detection area (i.e. the goal 1), in particular, since a phase change, that is, the change of a phase condition of 180° (a change in sign of a particular quantity) can be sensed with high precision.

Figure 9:
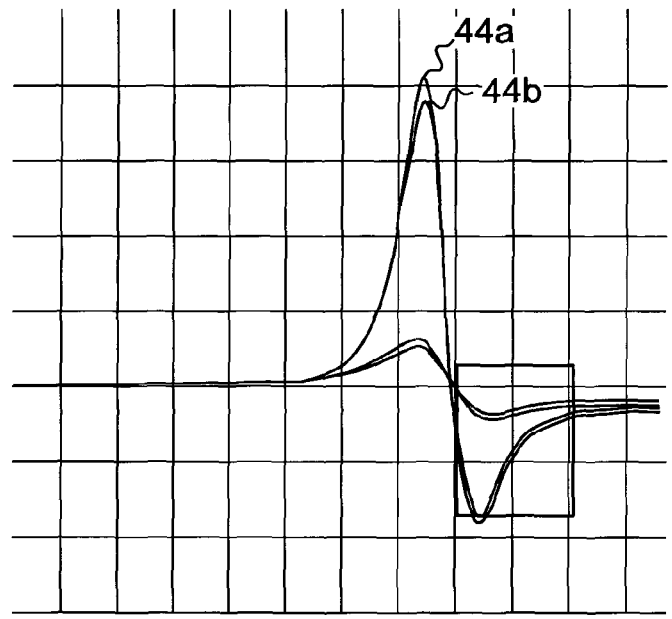
FIG. 9 shows a more detailed view of the signals as generated when the ball transits through the detection plane in the embodiment of FIG. 5.

FIG. 9 illustrates a possible implementation as to how the detection of the phase change may be performed, which additionally allows to cancel long-term effects such as temperature-induced drifts of the system or the like. In principle, the receive signals as received at signal terminals of the loop antennas 4a-d may be provided to or fed to a receiver circuit, where the backscatter signal, that is, the received signal as caused by the magnetic field 12 of the moving object 11, is down converted to a complex baseband signal. The down conversion results in a complex valued vector for the receive signal. The vector of the receive signal may be compared to the signal vector of the excitation signal used to generate the exciting electromagnetic field. As illustrated in FIG. 3 for an ideal configuration, the phase shift $\Delta\phi$ between the two vectors is 90°. However, due to differing cable lengths, variations and run times in the receiver circuits or similar influences, the phase shift will in general be different from 90°. The amplitude of the complex vector representing the received signal is dependent on the position of the ball, in particular, on the distance of the ball with respect to the detection plane. As indicated already in FIG. 8, however, a phase inversion occurs when the ball passes the detection plane or the goal line.

In the goal detection algorithms, the imaginary and real parts of the complex valued baseband signal may be processed separately. That is to say, an algorithm used to detect the transit of a moving object 11 through the detection plane 22 may search for a zero crossing point, that is, for a configuration where the complex valued vector crosses zero due to the change of the phase condition. In order to suppress noise effects, it may additionally be verified whether an amplitude peak above a certain minimum threshold occurred right before the phase change or the zero crossing point. Also in order to avoid wrong detections caused by long-term drifts of the whole system, further embodiments may utilize two different frequencies. One frequency of an excitation signal used for the generation of the exciting electromagnetic field 10 may correspond to the resonance frequency of the resonator 16 of the moving object 11 while a further frequency may be slightly below or above the resonance frequency. Therefore, the moving object or the ball 11 is less sensitive to the second frequency which results in an emitted magnetic field inducing a receive signal of a lower amplitude as compared to the receive signal caused by the excitation signal at the resonance frequency. Drift effects, however, influence both receive signals identically and a difference between the two signal amplitudes remains the same, when changes are induced by drift effects. Hence, those changes may be identified and compensated for. If, however, a ball is approaching the goal or the detection plane 22, the difference between both signals decreases and drops to zero when the ball crosses the detection plane 22 which allows for a discrimination against drift effects.

Further embodiments may avoid wrong determinations of goals by summing up the signal of the loop antennas 4a-d and of the further loop antennas 6a-d, that is, of the goal line antennas and the frame antennas to derive a complex vector indicating an orientation of the field generated or emitted by the ball 11 and hence an indication of the position of the ball with respect to the antenna system. In particular, using estimations of field vectors as determined by multiple antenna systems may provide for the possibility to estimate the position of the ball. This information may be furthermore used as a consistency check in order to avoid wrong detections of goals caused by noise or long-term drift effects.

FIG. 9 shows, for the two receive signals 42a and 42b illustrated in FIG. 8, the effect of using excitation signals of slightly differing frequency in order to generate the exciting electromagnetic field 10. The response, i.e., the receive signal caused by the electromagnetic field excited with the resonance frequency is shown in a first graph 44a, while the receive signal caused by an excitation signal from different antennas is illustrated by a second graph 44b. As illustrated in FIG. 9, the two signals show the signal characteristics elaborated on above and hence allow to avoid wrong detections of goals.

Figure 10:
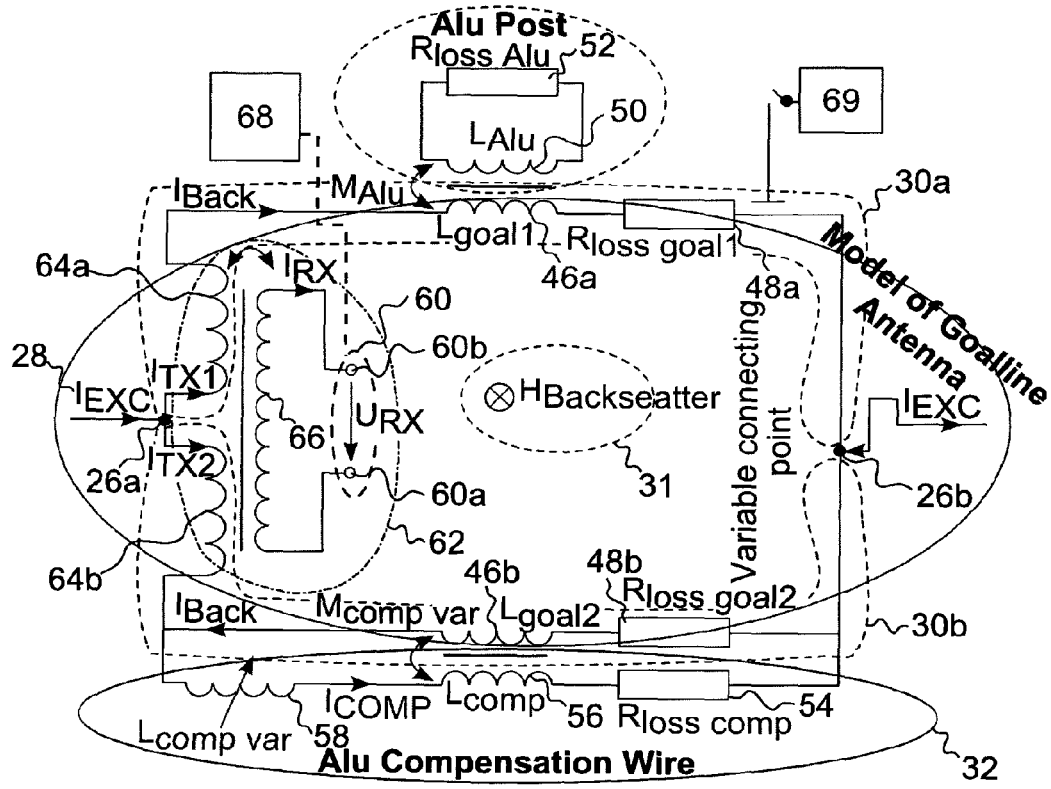
FIG. 10 shows a circuit diagram of an embodiment of an antenna system.

FIG. 10 shows a circuit diagram of an embodiment by illustrating the individual components of an antenna system 2c according to an embodiment and the coupling to its environment.

For simplicity of illustration only the loop antenna 4c is illustrated in FIG. 10, while the further loop antenna 6c, i.e. the frame antenna, is not shown, since this antenna need not be balanced or compensated with the same precision as the goal line or sensor antenna 4c. The loop antenna 4c comprises the first signal path 30a and the second signal path 30b. In a symmetry center of the two paths 30a, 30b, defining a region of zero or low magnetic excitation field, a magnetic core 31 is positioned. The transmission properties of the first and second signal paths 30a, 30b are illustrated by corresponding first and second inductances 46a and 46b as well as by corresponding first and second resistances 48a and 48b. As already mentioned before, the excitation signal 28 may be split at the first terminal 26a such as to utilize both signal paths 30a and 30b for the generation of the exciting electromagnetic field 10. The signal of both signal paths 30a and 30b is summed up at the second terminal 26b where the current source providing the excitation signal 28 connects. The influence of metallic post of a goal or the like is modeled by the inductive coupling between an inductance 50 of the aluminum post which is connected in series to an associated resistance 52. In order to compensate for the influence of the post the antenna system illustrated in FIG. 10 incorporates a compensation signal path 32, connected in parallel to the second signal path 30b. The compensation signal path 32 has associated thereto an inherent resistance 54 and an inherent inductance 56. A distance between the compensation signal path 32 and the second signal path 30b may, according to some embodiments, be adjustable in order to compensate for the influence of the eddy currents in the aluminum post. According to further embodiments, the compensation signal path 32 may furthermore comprise a variable inductance 58, such as to be able to compensate the influence of the aluminum post or of other influences more precisely. In other words, an additional wire may be used, which is running or extending in parallel to the second signal path 30b of the antenna loop 4c and which builds a coupling circuit ($L_{goal2}$, $L_{comp}$, $M_{com,var}$). By changing the distance between the compensation wire and the antenna loop 4c, the coupling factor $M_{comp,var}$ can be adjusted. In addition or alternatively, a variable inductor 58 or a variable capacitance may be implemented into the compensation path 32. The two variable elements $L_{comp,var}$ and $M_{comp,var}$ may be tuned in a way that both sides of the loop, i.e., the first signal path 30a at the first side of the detection plane 22 and the second signal path 30b in combination with the compensation signal path 32 at the opposite side of the detection plane 22 are balanced. That is to say, in the balanced situation, $I_{TX1}=I_{TX2}=\frac{1}{2}*I_{exc}$, with the current signals being in phase.

In some embodiments the loop antenna 4c may furthermore comprise a signal port 60 comprising a first signal terminal 60a and a second signal terminal 60b in order to provide the receive signal of the loop antenna 4c. The receive signal may be coupled out from the loop antenna 4c by means of a transformer 62. The transformer 62 may be formed by a first coil 64a and a second coil 64b as well as by a third coil 66. The first coil 64a may be part of the first signal path 30a and the second coil 64b may be part of the second signal path 30b, wherein the first terminal 28 may be situated between the first and second coils 64a and 64b. The first and second coils 64a and 64b may, however, be wound with different orientations, i.e., the third coil 66 may be coupled to the first and second coils 64a and 64b such that essentially no current is induced in the third coil 66 when the current through the first and second coils 64a and 64b is essentially equal, i.e., when the antenna is balanced. Therefore, in the situation of a balanced antenna, no current is induced in the third coil 66 and hence no significant receive signal is provided at the first and second signal terminals 60a and 60b when the moving object is not present or close.

In order to be able to perform the above discrimination of the receive signal 29 and hence the determination of a transit of the ball 11 through the detection plane 22, however, knowledge on a phase relation between the excitation signal 28 and a receive signal 29 as provided at the signal terminals 60a and 60b may be desirable. Arbitrary amplitude and phase distortion may result from a delay in the antenna cables or in the receiving path of a receiver coupled to the signal terminal 60. These may need to be compensated. In the desirable configuration of a fully-balanced antenna system, however, no signal is present at the signal terminals 60a and 60b which may be utilized for the determination of the phase relation.

In order to provide for the possibility of such a calibration, further embodiments may optionally comprise a calibration signal generator 69 which may be operable to modify the characteristics of the antenna system such that a signal is generated at the signal terminals 60a and 60b. According to some embodiments, this may be achieved by switchable tuning elements in the first and/or the second signal paths 30a, 30b to intentionally bring the antenna out of balance. Examples of those tuning elements may be additional inductors or coupling elements which can be switched on and off by means of relays or transistor circuits. That is to say, according to some embodiments, the calibration signal generator 69 may comprise a calibration circuit being coupleable to the first or the second signal path 30a or 30b on demand.

Figure 11:
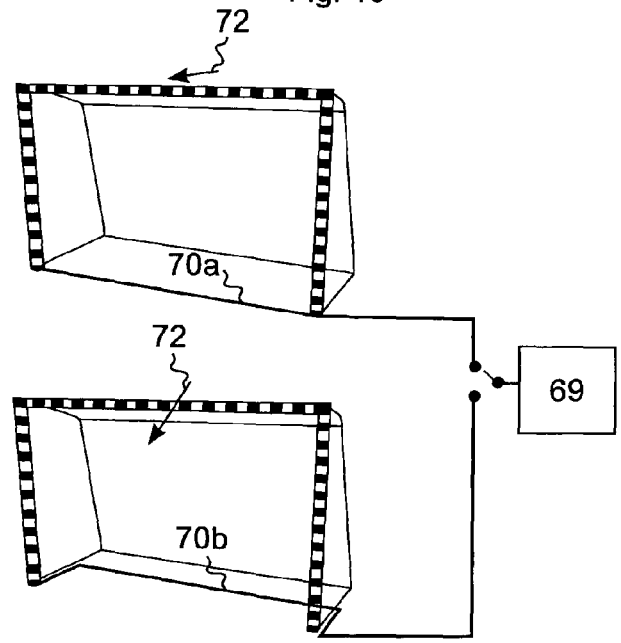
FIG. 11 shows an implementation of a calibration signal generator for generating a calibration signal.

According to another embodiment, however, the calibration signal generator 69 may allow to change the configuration of the circuitry used to generate the exciting electromagnetic field 10 such that the changed exciting electromagnetic field 10 may induce a minor amount of current into the loop antenna 4c and, optionally, also in the further loop antenna 6c (the frame antenna). Different exciter loop configurations may be changed by means of a relay or transistor circuitry, which is capable of switching between at least two different configurations. According to the embodiment of FIG. 11, the calibration signal generator 69 may be operable to select one of two different ground loop signal paths 70a and 70b. In the configuration of the first ground loop signal path 70a, the field vector 72 of the magnetic component of the exciting electromagnetic field 10 as created by the loop antenna 4c is, at the detection plane 22, perpendicular to said detection plane 22 and, therefore, no signal is induced into a balanced sensor loop antenna 4c. In the second configuration, as illustrated in the lower illustration of FIG. 11, however, a second ground loop signal path 70b is chosen such that the field vector 72 is slightly inclined and, hence, a signal is induced in the sensor loop antenna 4c. The so induced signal may be utilized to determine the phase relation between the exciting signal 28 and the receive signal 29.

The antenna system of FIG. 10 may further comprise a signal evaluator 68 coupled to signal terminal 60 of the antenna system to evaluate the receive signal and to determine a signal indicative of the position and/or transit of the moving object through the detection plane 22.

Figure 12A:
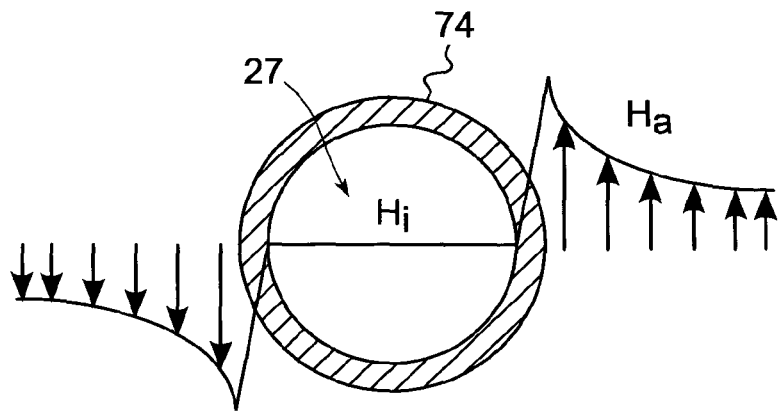
FIG. 12a-c show embodiments wherein an exciter antenna is formed by a hollow electric current conductor, and wherein a sensor antenna comprises the at least one magnetic core inside the hollow electric current conductor.
Figure 12B:
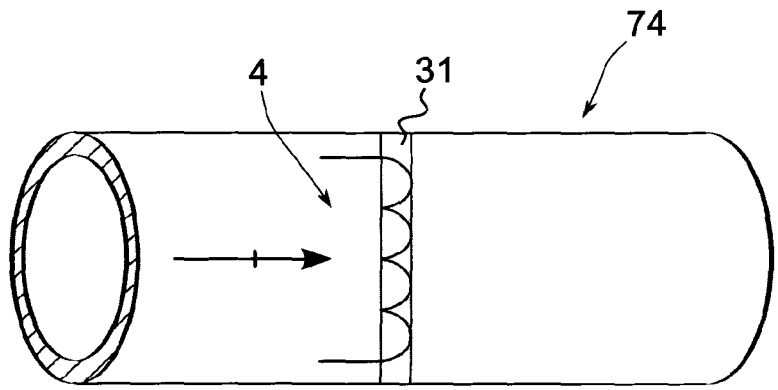

According to further embodiments a field-free region 27, i.e. a region of the exciting electromagnetic field 12 below the field strength threshold, for a sensor loop antenna with or without magnetic core may as well be obtained if hollow electric conductors or coaxial transmission lines for carrying the exciting current $I_{EXC}$ are employed. Hence, the at least one exciting antenna (loop) may be formed by a hollow electric current conductor according to some embodiments. As is schematically illustrated in FIG. 12a, there is a region 27 inside a hollow electric conductor 74 or coaxial transmission line in which the magnetic field caused by the exciting current $I_{EXC}$ flowing in the hollow electric conductor' hull is theoretically not present. That is to say, inside the hollow conductor 74 the magnetic field $H_i$ is at least close to zero, while outside the casing of the hollow conductor 74 the field $H_a$ behaves conventionally. Hence, the at least one sensor antenna may comprise at least one magnetic core located inside the hollow electric current conductor 74, wherein the at least one magnetic core is associated to a sensor antenna loop. A sensor loop antenna 4 with a magnetic core 31 inside a hollow conductor 74 is schematically illustrated in FIG. 12b.

According to some embodiments an external receive signal (resulting from a response electromagnetic field outside or external to the hollow conductor) may be detected by means of a sensor loop antenna inside the hollow current conductor/coaxial transmission line even without an additional magnetic core. When using a magnetic core inside the sensor loop antenna 4 a so-called shielded magnet antenna for the sensor loop may be realized. By means of adequate circuitry within the hollow conductor 74 electric field components may be kept away from the sensor loop 4. Hence, parasitic coupling due to electric field components alone may be suppressed.

Figure 12C:
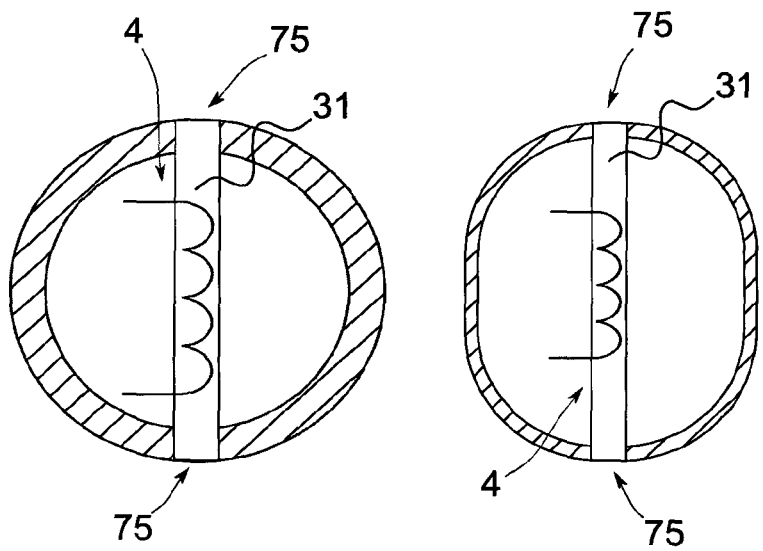

The hollow conductor 74 may be a goal post or crossbar according to some embodiments relating to goal detection applications. The shielding effect of the goal post (e.g. aluminum) may be weakened or avoided by means of various measures. Such measures can be adequate selection of material (e.g. non-conductors) or material combinations (e.g. conductor/non-conductor) or cavities in the goal post material, such as wholes, slits, or the like. Hence, an electrically conductive hull of the hollow electric conductor 74 may comprise (essentially) electrically non-conductive portions for passing the electromagnetic response signal to the magnetic core 31 of the at least one sensor antenna inside the hollow electric conductor 74. In some embodiments the at least one exciting antenna may be formed by a hollow goalpost of a goal, and the at least one magnetic core 31 of the sensor antenna may be located inside the goalpost. A flush mount of ferrite bars 31 in a hollow goal post acting as magnetic cores of a sensor loop 4 inside the goal post is illustrated in the top views of FIG. 12c. A magnetic component of the electromagnetic response signal may be coupled to the sensor antenna loop 4 or its magnetic core 31 inside the hollow goal post by means of non-conductive portions 75 in the goal post's hull, such as wholes or slits.

When the sensor antenna the magnetic core 31 is located inside the goalpost the magnetic core 31 is also positioned essentially in the detection plane 22, which is defined by the goalposts and/or the goal's cross bar in this case. To be more specific, the longitudinal axis of the magnetic core 31 is located essentially within the (physical) detection plane 22. The skilled person will recognize that for goal detection purposes a virtual detection plane can be placed half a ball diameter behind the physical detection plane 22 by means of adequate software algorithms.

Figure 13:
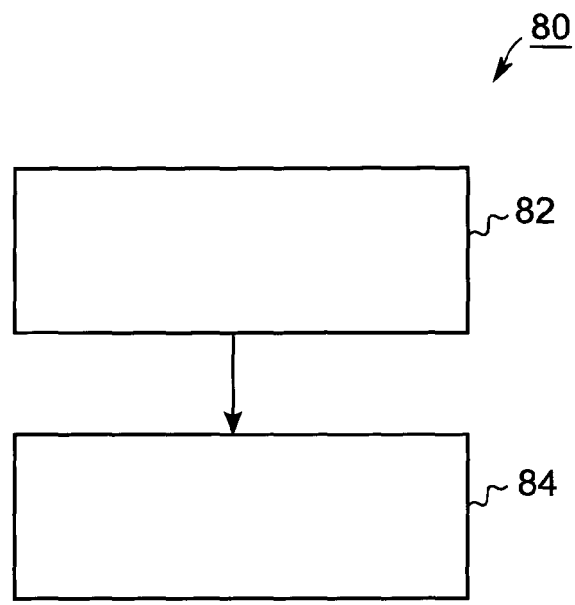
FIG. 13 shows a flow chart of an embodiment of a method according an embodiment.

FIG. 13 illustrates schematically a flow diagram 80 for a method for determining a transit of a moving object through a detection area within a detection plane according to an embodiment. The moving object emits a magnetic field, for example by backscattering using a configuration shown in FIG. 14. The method 80 comprises an act 82 of providing or generating, by means of at least one exciter antenna 9, an exciting electromagnetic field 12 above a field strength threshold in proximity to or within the detection plane 22, wherein the exciting electromagnetic field is capable of exciting the movable object 11 to emit an electromagnetic response signal 44a, 44b comprising information on a position of the movable object 11. Further the method comprises an act 84 of receiving, by means of at least one sensor antenna 4a-d comprising a magnetic core 31, the electromagnetic response signal 44a, 44b, wherein the at least one magnetic core 31 is positioned in a region 27 of the exciting electromagnetic field 12 below the field strength threshold.

FIG. 14 shows an embodiment of sports equipment or a sensor configuration to be used with an antenna system according to any of the embodiments which emits a magnetic field 12 used to determine the transit of the sports equipment or the moving object through the detection plane 22. The moving object or sports equipment of FIG. 14 comprises three pairwise perpendicular antenna loops 14a to 14c which may be connected in series with a resonator 16 having a resonance frequency corresponding essentially to the frequency of an exciting electromagnetic field 10. According to some embodiments, the resonance frequency is within the range of 10 kHz to 300 kHz or, preferably, in the range of 30 kHz to 200 kHz, such as to use electromagnetic fields not being disturbed by the presence of human beings, animals or other living creatures so that a reliable detection of a goal may be performed, even when the area of the goal is crowded with soccer players or other people.

Although primarily illustrated and explained with respect to the detection of goals in a soccer match, further embodiments may be utilized in any other scenario where it is desirable to detect the transit of a movable object or of any kind of object through a particular detection plane. This may, for example, be any other kind of sports game, such as for example, handball, American football, polo, cricket, hockey, ice hockey or the like. Furthermore, embodiments may be utilized to track the transportation of movable goods within a warehouse or the like. In another implementation, embodiments of antenna systems may be utilized to detect the crossing of joggers or cyclists or other competitors at the start line of a mass sports event or the like.

The description and drawings merely illustrate the principles of embodiments. It will thus be appreciated that those skilled in the art will be able to devise various arrangements that, although not explicitly described or shown herein, embody the principles of embodiments and are included within its spirit and scope. Furthermore, all examples recited herein are principally intended expressly to be only for pedagogical purposes to aid the reader in understanding the principles of embodiments and the concepts contributed by the inventor(s) to furthering the art, and are to be construed as being without limitation to such specifically recited examples and conditions. Moreover, all statements herein reciting principles, aspects, and embodiments, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or suited for s.th.". A means being adapted for performing a certain function does, hence, not imply that such means necessarily is performing said function (at a given time instant).

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of embodiments. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:

1. An antenna system for determining a transit of a movable object through a detection area within a detection plane, the antenna system comprising:
   at least one exciter antenna configured to provide an exciting electromagnetic field, wherein the exciting electromagnetic field or at least one spatial component has a field strength above a field strength threshold in the detection area, wherein the exciting electromagnetic field is capable of exciting the movable object to emit an electromagnetic response signal; and
   at least one magnetic core of a sensor antenna for receiving the electromagnetic response signal, wherein the at least one magnetic core is positioned in a region of the exciting electromagnetic field where the field strength of the exciting electromagnetic field or at least one spatial component thereof is below the field strength threshold;
   wherein the region of the exciting electromagnetic field having a field strength below the field strength threshold is a region of destructive superposition of electromagnetic field components originating from one or more electrical conductors of the exciter loop antenna.

2. The antenna system of claim 1, wherein the magnetic core is positioned in the detection plane.

3. The antenna system of claim 1, wherein the at least one exciter antenna comprises at least one exciting loop antenna, the exciting loop antenna spanning the detection plane, and wherein the sensor antenna comprises at least one sensor loop antenna around the magnetic core, the sensor loop antenna spanning a sensor antenna plane perpendicular to the detection plane.

4. The antenna system of claim 3, wherein a longitudinal axis of the at least one magnetic core of the sensor antenna is located within the detection plane and extending perpendicular to the sensor antenna plane.

5. The antenna system of claim 3, wherein the at least one exciter antenna loop comprises a first terminal and a second terminal, and wherein an excitation signal is transferable from the first terminal to the second terminal via a first signal path and via a different second signal path of the at least one exciter antenna loop.

6. The antenna system of claim 5, wherein the first and the second signal path extend symmetrically and on different sides of the detection plane, and wherein the first and the second signal path further span a sensor antenna plane being perpendicular to the detection plane.

7. The antenna system of claim 5, wherein the antenna system is configured such that the excitation signal propagates from the first terminal to the second terminal via the first signal path and the second signal path simultaneously and in phase.

8. The antenna system of claim 5, wherein the at least one magnetic core of the sensor antenna is located in between the first and the second signal path within a predefined area around an intersection of the detection plane and the sensor antenna plane, the predefined area forming the region of the exciting electromagnetic field below the field strength threshold.

9. The antenna system of claim 1, wherein the at least one exciter loop antenna comprises a hollow goalpost of a goal, and wherein the at least one magnetic core of the sensor antenna is located inside the goalpost.

10. The antenna system of claim 1, wherein the at least one exciter antenna is configured to provide the exciting electromagnetic field, such that two of three mutually perpendicular spatial components of the exciting electromagnetic field essentially vanish within the detection plane, wherein the third non-vanishing component of the exciting electromagnetic field forms a normal of the detection plane and is capable of exciting the movable object to emit the electromagnetic response signal, and wherein the magnetic core is positioned in the detection plane, such that a longitudinal axis of the magnetic core extends in the detection plane and perpendicularly to the third non-vanishing exciting electromagnetic field component.

11. The antenna system of claim 1, wherein the magnetic core comprises a ferromagnetic or ferrimagnetic material.

12. A method for determining a transit of a movable object through a detection area within a detection plane, the method comprising:
   providing, by means of at least one exciter antenna, an exciting electromagnetic field, wherein a spatial component of the exciting electromagnetic field perpendicular to the detection plane has a field strength above a field strength threshold in the detection area, wherein the exciting electromagnetic field is capable of exciting the movable object to emit an electromagnetic response signal and
   receiving, by means of at least one sensor antenna comprising a magnetic core, the electromagnetic response signal, wherein the at least one magnetic core is positioned in a region of the exciting electromagnetic field where the field strength of the exciting electromagnetic field or at least one spatial component thereof is below the field strength threshold, wherein the region of the exciting electromagnetic field having a field strength below the field strength threshold is a region of destructive superposition of electromagnetic field components originating from one or more electrical conductors of the exciter loop antenna.

13. An antenna system for determining a transit of a movable object through a detection area within a detection plane, the antenna system comprising:
   at least one exciter antenna configured to provide an exciting electromagnetic field, wherein the exciting electromagnetic field or at least one spatial component has a field strength above a field strength threshold in the detection area, wherein the exciting electromagnetic field is capable of exciting the movable object to emit an electromagnetic response signal; and
   at least one magnetic core of a sensor antenna for receiving the electromagnetic response signal, wherein the at least one magnetic core is positioned in a region of the exciting electromagnetic field where the field strength of the exciting electromagnetic field or at least one spatial component thereof is below the field strength threshold,
   wherein the at least one exciter antenna comprises a hollow electric current conductor, and wherein the at least one sensor antenna comprises the at least one magnetic core inside the hollow electric current conductor.

14. The antenna system of claim 13, wherein an electrically conductive hull of the hollow electric conductor comprises electrically non-conductive portions for passing the electromagnetic response signal to the magnetic core of the at least one sensor antenna.

* * * * *